US011916307B2

(12) United States Patent
Svendsen et al.

(10) Patent No.: US 11,916,307 B2
(45) Date of Patent: Feb. 27, 2024

(54) ANTENNA

(71) Applicant: NOKIA SOLUTIONS AND NETWORKS OY, Espoo (FI)

(72) Inventors: Simon Svendsen, Aalborg (DK); Poul Olesen, Støvring (DK)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 283 days.

(21) Appl. No.: 17/018,967

(22) Filed: Sep. 11, 2020

(65) Prior Publication Data

US 2021/0083383 A1 Mar. 18, 2021

(30) Foreign Application Priority Data

Sep. 12, 2019 (EP) .................................... 19196893

(51) Int. Cl.

*H01Q 5/35* (2015.01)
*H01Q 13/08* (2006.01)
*H01Q 21/06* (2006.01)

(52) U.S. Cl.

CPC ............... *H01Q 5/35* (2015.01); *H01Q 13/08* (2013.01); *H01Q 21/068* (2013.01)

(58) Field of Classification Search

CPC ........ H01Q 5/35; H01Q 13/08; H01Q 21/068; H01Q 1/52; H01Q 3/24

See application file for complete search history.

(56) References Cited

U.S. PATENT DOCUMENTS

| | | | |
|---|---|---|---|
| 6,356,242 | B1 | 3/2002 | Ploussios |
| 2005/0239519 | A1 | 10/2005 | Saitou et al. |
| 2006/0192720 | A1 | 8/2006 | Shtrom |
| 2008/0150819 | A1 | 6/2008 | Uno et al. |
| 2012/0133571 | A1 | 5/2012 | Collins et al. |
| 2013/0307740 | A1 | 11/2013 | Pajona et al. |
| 2014/0227982 | A1 | 8/2014 | Granger-Jones et al. |

(Continued)

FOREIGN PATENT DOCUMENTS

| | | | |
|---|---|---|---|
| CN | 1 979 951 | A | 6/2007 |
| CN | 101461093 | A | 6/2009 |
| CN | 102474001 | A | 5/2012 |

(Continued)

OTHER PUBLICATIONS

Extended European Search Report for European Application No. 19196893.2 dated Feb. 26, 2020, 10 pages.

(Continued)

*Primary Examiner* — Dieu Hien T Duong
(74) *Attorney, Agent, or Firm* — ALSTON & BIRD LLP

(57) ABSTRACT

An apparatus is provided that includes a first multi-port antenna that operates with a first radiation pattern when a first port is used and operates with a second radiation pattern, different to the first radiation pattern, when a second port, different to the first port, is used. The apparatus also includes a second multi-port antenna that operates with a third radiation pattern when a third port is used and operates with a fourth radiation pattern, different to the third radiation pattern, when a fourth port, different to the third port, is used. The apparatus further includes at least one switch for selecting one of multiple paths between a node and each port of a pair of ports.

20 Claims, 16 Drawing Sheets

(56) References Cited

U.S. PATENT DOCUMENTS

| | | | |
|---|---|---|---|
| 2018/0212304 | A1 | 7/2018 | Peng et al. |
| 2019/0006734 | A1 | 1/2019 | Svendsen et al. |

FOREIGN PATENT DOCUMENTS

| | | | | |
|---|---|---|---|---|
| EP | 3 185 358 | | | 6/2017 |
| JP | 2005045346 | A | * | 2/2005 |
| JP | 2005124056 | A | * | 5/2005 |
| JP | 2008-060907 | A | | 3/2008 |
| WO | WO-2019/005145 | | | 1/2019 |

OTHER PUBLICATIONS

Office Action for European Application No. 19196893.2 dated Sep. 15, 2023, 8 pages.

Office Action for Chinese Application No. 202010952305.8 dated Dec. 7, 2023, 21 pages.

* cited by examiner (-45° offset)

(0° offset)

(45° offset)

(90° offset)

(135° offset)

(180° offset)

ANTENNA

CROSS-REFERENCE TO RELATED APPLICATIONS

This application claims priority to European Application No. 19196893.2, filed Sep. 12, 2019, the entire contents of which are incorporated herein by reference.

TECHNOLOGICAL FIELD

Embodiments of the present disclosure relate to an antenna. Some embodiments relate to an antenna for radio equipment.

BACKGROUND

Radio equipment is equipment designed to transmit radio frequency electromagnetic signals that carry information and/or receive radio frequency electromagnetic signals that carry information.

The radio equipment comprises radio frequency circuitry that operates as a transmitter, receiver or transceiver, and one or more antennas.

An antenna provides part of a carefully designed coupling between the radio frequency circuitry and the air interface. It has a carefully controlled frequency-dependent complex impedance.

An antenna is sometimes designed to resonate with a low Q-factor so that it has a broad operational bandwidth. It can therefore sometimes be difficult to isolate one antenna from another using frequency division.

As an antenna has a frequency-dependent complex impedance it is susceptible to inductive and capacitive effects arising from the presence of conductors and/or flow of electric currents in its vicinity.

It can therefore be a challenging task to have multiple antennas operate simultaneously, particularly in radio equipment, for example mobile radio equipment, where extreme physical separation of the antennas is not possible or not practical.

In this context mobile radio equipment refers to a size of equipment that can be moved by a person and can include smaller base stations, access points, user equipment (UE), Internet of Things (IoT) devices, radio modules for vehicles etc.

BRIEF SUMMARY

According to various, but not necessarily all, embodiments there is provided an apparatus comprising:

a first multi-port antenna wherein the multi-port antenna operates with a first radiation pattern when a first port is used and operates with a second radiation pattern, different to the first radiation pattern, when a second port, different to the first port, is used;

7*a* second multi-port antenna wherein the multi-port antenna operates with a third radiation pattern when a third port is used and operates with a fourth radiation pattern, different to the third radiation pattern, when a fourth port, different to the third port, is used; and at least one switch for selecting one of multiple paths between a node and each port of a pair of ports.

In some but not necessarily all examples, the pair of ports are the first port and the second port of the first multi-port antenna. In some but not necessarily all examples the pair of ports are the first port of the first multi-port antenna and the third port of the second multi-port antenna.

In some but not necessarily all examples, the multiple paths include a first path between the node and one of the pair of ports and another second path between the node and the other port of the pair of ports, wherein the first path and the second path are arranged at least partially in electrical parallel. In some but not necessarily all examples, the multiple paths include a first path between the node and one port of the pair of ports and another second path between that port and the other port of the pair of ports, wherein the first path and the second path are arranged in electrical series.

In some but not necessarily all examples, the multiple paths between the node and each port of the pair of ports share a transmission line that comprises one or more feed points along a length of the transmission line and interconnects lengthwise the pair of ports, wherein the at least one switch is configured to selectively interconnect the node to one of the feed points.

In some but not necessarily all examples, the first port faces the fourth port, and the second port faces the third port.

In some but not necessarily all examples, the at least one switch is configured to select one of multiple paths between the node and the first port and the third port.

In some but not necessarily all examples, the at least one switch or an additional switch is configured to select one of multiple paths between an additional node and the second port and the fourth port.

In some but not necessarily all examples, the apparatus comprises: a first set of parallel paths for interconnection of the first port and the third port, each of the first set of paths having a different phase offset; one or more first switches for selecting one of the first set of paths; a second set of parallel paths for interconnection of the second port and the fourth port, each of the second set of paths having a different phase offset; and one or more second switches for selecting one of the second set of paths.

In some but not necessarily all examples, the multi-port antenna comprises a first antenna element coupled to the first port, a second antenna element coupled to the second port, wherein the first antenna element and the second antenna element are spaced apart and partially overlap without touching, wherein the first port provides a first indirect feed for the first antenna element that operates with the first antenna pattern and the second port provides a second indirect feed for the second antenna element that operates with the second antenna pattern, different to the first antenna pattern, wherein each of the first antenna element and the second antenna element has a same shape and are arranged with different handedness, wherein the first antenna element is a monopole antenna element of a first length, wherein the second antenna element is a monopole antenna element of a second length, and wherein the first antenna element is bent and the second antenna element is bent.

In some but not necessarily all examples, the apparatus comprises a ground plane with a perimeter, wherein the first and second multi-port antennas share the ground plane, wherein the first multi-port antenna is part of a first antenna module comprising:

a first support positioned within the perimeter of the ground plane and extending outwardly from the ground plane, wherein the first multi-port antenna is supported by the first support at a distance from the ground plane, wherein the second multi-port antenna is part of a second antenna module comprising: a second support positioned within the perimeter of the ground plane and extending outwardly from the ground plane, wherein the second multi-port antenna is supported by the second support at a distance from the ground plane.

In some but not necessarily all examples, the apparatus comprises the node and an additional node and comprises an analogue signal interference cancellation circuit coupled between the node and the additional node, wherein the analogue signal interference cancellation circuit comprises:

a first coupling element associated with the node;

a second coupling element associated with the additional node; and a phase shifter in a path between the first and second coupling elements.

In some but not necessarily all examples, the apparatus comprises a network of one or more radio frequency switches for selectively interconnecting radio transceivers simultaneously to antenna modules.

In some but not necessarily all examples, the switch network is configured to enable multiple different radiation patterns per transceiver.

In some but not necessarily all examples, the apparatus is configured as radio equipment or mobile radio equipment.

According to various, but not necessarily all, embodiments there is provided an apparatus as claimed in any preceding claim, comprising:

a first multi-port antenna wherein the multi-port antenna operates with a first radiation pattern when a first port is used and operates with a second radiation pattern, different to the first radiation pattern, when a second port, different to the first port, is used;

a second multi-port antenna wherein the multi-port antenna operates with a third radiation pattern when a third port is used and operates with a fourth radiation pattern, different to the third radiation pattern, when a fourth port, different to the third port, is used, wherein the first port faces the fourth port, and the second port faces the third port.

In some but not necessarily all examples, the apparatus comprises at least one switch for controlling interconnection of the first port and the third port. In some but not necessarily all examples, the at least one switch is configured to select one of multiple paths between a node, the first port and the third port.

According to various, but not necessarily all, embodiments there is provided an apparatus as claimed in any preceding claim, comprising a first multi-port antenna wherein the multi-port antenna operates with a first radiation pattern when a first port is used and operates with a second radiation pattern, different to the first radiation pattern, when a second port, different to the first port, is used;

at least one switch for selecting one of multiple paths between a node and each port of a pair of ports, wherein the multiple paths between the node and each port of the pair of ports share a transmission line that comprises one or more feed points along a length of the transmission line and interconnects lengthwise the pair of ports, wherein the at least one switch is configured to selectively interconnect the node to one of the feed points.

According to various, but not necessarily all, embodiments there is provided an apparatus as claimed in any preceding claim, comprising a first multi-port antenna wherein the multi-port antenna operates with a first radiation pattern when a first port is used and operates with a second radiation pattern, different to the first radiation pattern, when a second port, different to the first port, is used;

a second multi-port antenna wherein the multi-port antenna operates with a third radiation pattern when a third port is used and operates with a fourth radiation pattern, different to the third radiation pattern, when a fourth port, different to the third port, is used;

a transmission line that comprises one or more feed points along a length of the transmission line and that interconnects lengthwise one of the first port, second port, third port or fourth port with another of the first port, second port, third port or fourth port; and at least one switch for selectively interconnecting a node for a receiver or transmitter to a selected one of the feed points.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

The various FIGs illustrate examples of an apparatus 10 with a reconfigurable radiation pattern 60.

In some but not necessarily all examples, the apparatus 10 is radio equipment or mobile radio equipment or a component for radio equipment or mobile radio equipment. Mobile radio equipment refers to a size of equipment that can be moved by a person and can include smaller base stations, access points, user equipment (UE), Internet of Things (IoT) devices, radio modules for vehicles etc.

Figure 1:
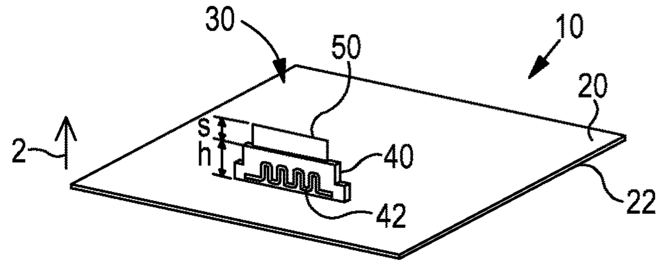
FIG. 1 shows an example embodiment of the subject matter described herein.

FIG. 1 illustrates an example of the apparatus 10. The apparatus 10 comprises a ground plane 20 having a perimeter 22; at least one support 40 positioned within the perimeter 22 of the ground plane 20 and extending outwardly 2 from the ground plane 20; and at least one multi-port antenna 50 supported by the support 40 at a distance h from the ground plane 20.

Figure 2A:
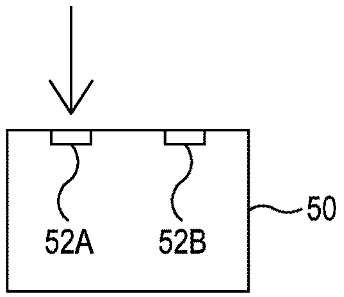
FIG. 2A, 2B show another example embodiment of the subject matter described herein.
Figure 2B:
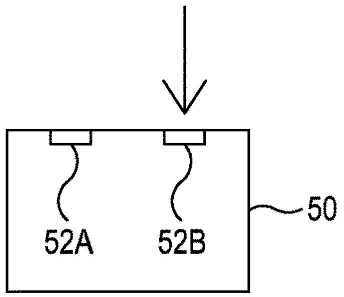
Figure 3A:
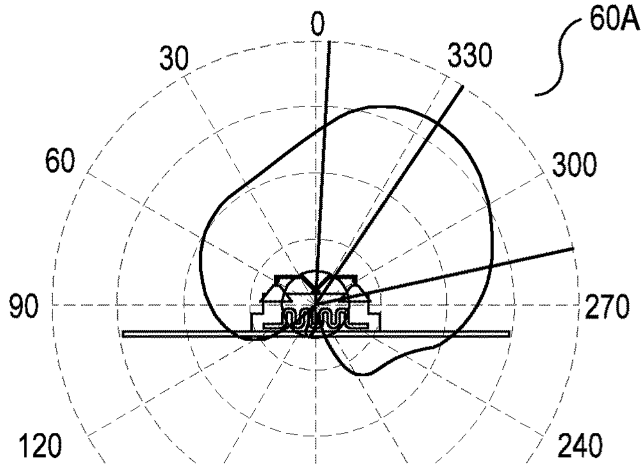
FIG. 3A, 3B show another example embodiment of the subject matter described herein.
Figure 3B:
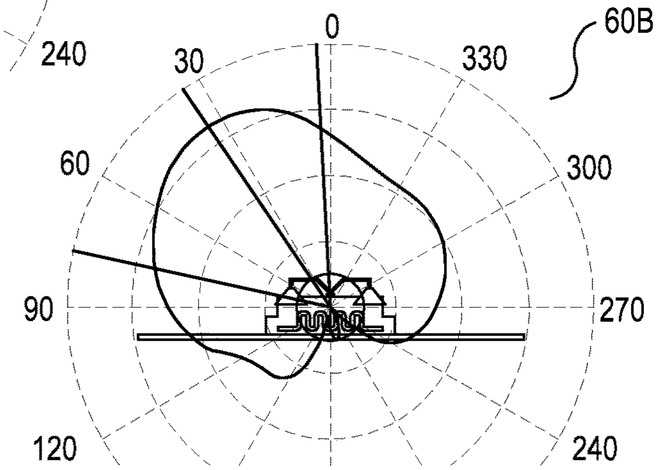

The multi-port antenna 50 has at least a first port 52A and a second port 52B. There is a different radiation pattern 60 associated with each port 52A, 52B. The multi-port antenna 50 operates with a first radiation pattern 60A (FIG. 3A) when the first port 52A is used (FIG. 2A) and operates with a second radiation pattern 60B (FIG. 3B), different to the first radiation pattern 60A, when a second port 52B, different to the first port 52A, is used (FIG. 2B).

The combination of the support 40 and the multi-port antenna 50 having a first port 52A and a second port 52B form an antenna module 30.

The first radiation pattern 60A and the second radiation pattern 60B are far-field radiation patterns and are uncorrelated having an isotropic envelope correlation coefficient of less than 50%.

As can be seen in FIG. 1, the support 40 comprises a slot 42 positioned between the multi-port antenna 50 and the ground plane 20.

The support 40 is spaced from the perimeter 22 of the ground plane 20.

In this example, but not necessarily all examples, the ground plane 20 extends in a substantially flat plane. In this example, but not necessarily all examples, the support 40 is up-standing from the substantially flat plane.

In some examples, the ground plane 20 is not substantially in a flat plane. For example, the ground plane 20 can, in some examples, comprise one or more non-planar portions which are in a common flat pane and the ground plane 20 can have a three-dimensional shape. In some but not necessarily all examples at least a portion of the ground plane 20 conforms to one or more surfaces of one or more of a device, mechanical part and/or electronic part. The ground plane 20 can, for example, conform to a housing part. In some but not necessarily all examples, the ground plane 20 has no flat planar portion at all or only a portion of the ground plane 20 comprises a flat planar portion.

In the illustrated example, but not necessarily all examples, the support 40 is up-standing from the substantially flat plane perpendicularly from the plane at an angle of 90o. However, in other example, the angle can be other than 90o.

The substantially flat plane is normal to a vector in a first direction. In the example illustrated, the support 40 extends outwardly, in the first direction 2, from the ground plane 20. In the example illustrated, the support 40 extends parallel to the first direction. In other examples, the support 40 can extend in a direction parallel to the flat plane. In other examples, the support 40 can extend in a direction that has a component that is parallel to the flat plane and a component that is parallel to the first direction.

The multi-port antenna 50 supported by the support 40 is separated from the ground plane 20 in the first direction 2.

In some examples the support 40 is a planar supporting structure that has a relatively thin depth compared to its height h and width. The slot 40 extends all the way through the depth of the support 40 from a first side of the support 40 to a second side of the support 40.

The support 40 comprises conductive material that operates as a ground plane for the multi-port antenna 50.

In this example, but not necessarily all examples, multi-port antenna 50 is supported at a top of the support 40 with a maximal separation from the ground plane 20.

The minimum separation distance h between the multi-port antenna 50 and the ground plane 20 can be any value. It can be used to control a Q-factor of the multi-band antenna 50. Increasing h will lower the Q-factor.

The ports 52A, 52B can be electrically coupled via the support 40 to radio circuitry (not shown).

The multi-port antenna 50 and the support 40 can, in at least some examples, be separate components that are attached to one another mechanically (and electrically). The multi-port antenna 50 and/or the support 40 can be formed from a composite structure comprising insulating portions and conductive portions.

The multi-port antenna 50 and the support 40 can, in at least some examples, be a single component. The multi-port antenna 50 and the support 40 can be formed from a composite structure comprising insulating portions and conductive portions.

In some examples, the composite structure is a laminate structure comprising multiple layers. In this example, the multi-port antenna 50 and/or the support 40 are formed from a multi-layered structure comprising an insulating substrate and one or more conductive layers overlying, at least partially, the substrate. The substrate can, for example, be a flat, planar board.

The substrate can, for example, comprise glass-reinforced epoxy laminate material (e.g. FR-4).

In some examples, the composite structure is formed by laser direct structuring. For example, a thermoplastic material, doped with a non-conductive metallic inorganic compound is made selectively conductive at its surface using a laser. The composite structure may be a molded composite structure that uses injection molded thermoplastics.

In some examples, the composite structure is a molded interconnect device (MID) comprising an injection-molded thermoplastics part with one or more integrated conductors. The composite structure is thus a molded composite structure.

In some examples, the multi-port antenna 50, the support 40 and the ground plane 20 can be a single component. The single component can be formed as a molded composite structure comprising insulating portions and conductive portions.

Figure 4:
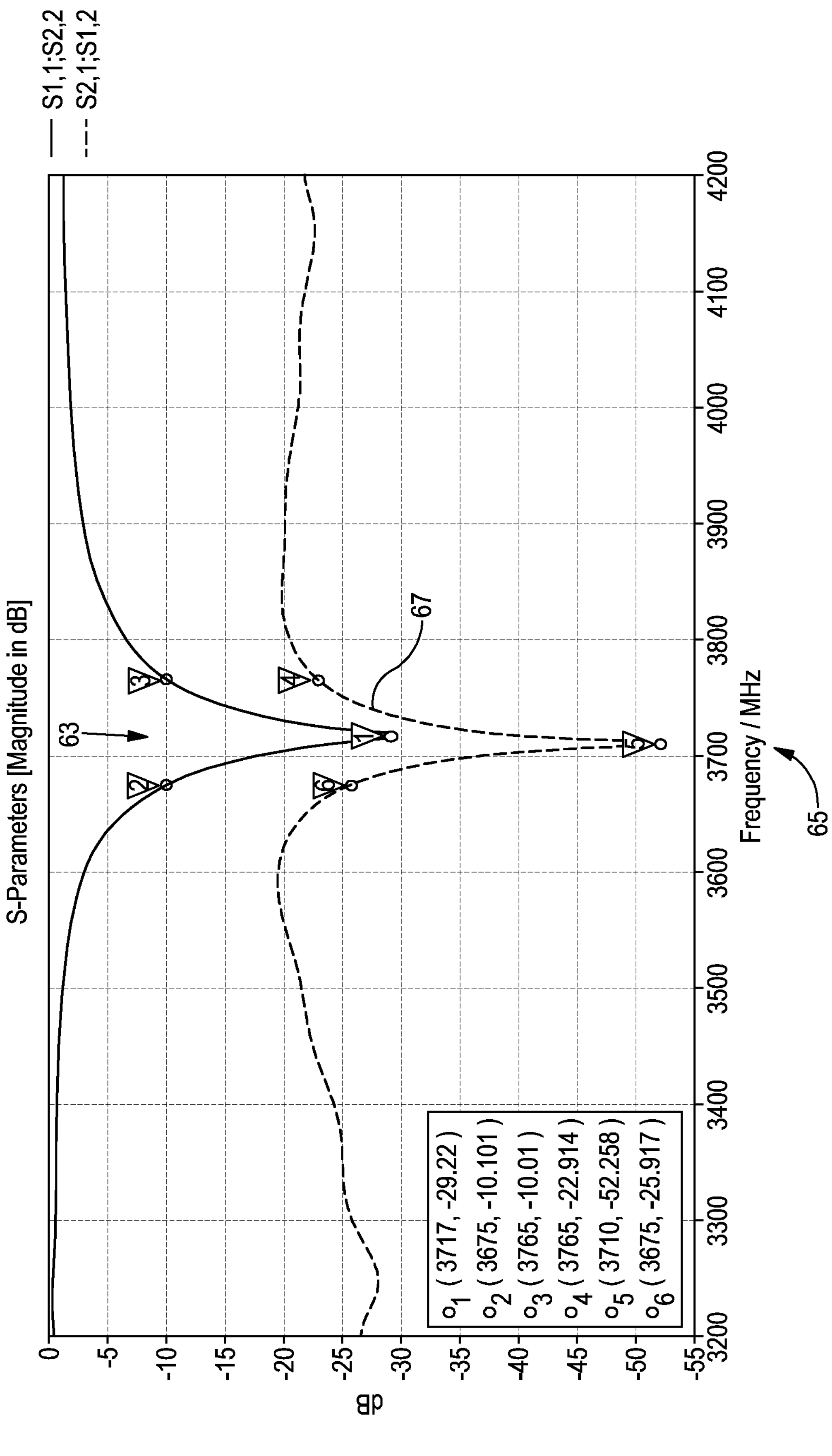
FIG. 4 shows another example embodiment of the subject matter described herein.

FIG. 4 illustrates the S parameters of the multi-port antenna 50. The multi-port antenna 50 is configured to have an operational bandwidth 63 at a resonant frequency (fR) 65. This is illustrated by the plot of the S11 and S22 parameters in FIG. 4. The operational bandwidth is between the markers 2 & 3 in the FIG. The multi-port antenna 50 is configured to have excellent isolation between the first port 52A and the second port 52B. This is illustrated by the plot 67 of the S21 and S21 parameters in FIG. 4. The isolation is between 25 and 50 dB.

The design is symmetric so S11 and S22 are on top of each other in the plot and S12 and S21 are on top of each other in the plot.

The high isolation between the feed points enables easy switch combining of different combinations of feed points as the different ports are not loading each other.

Figure 5:
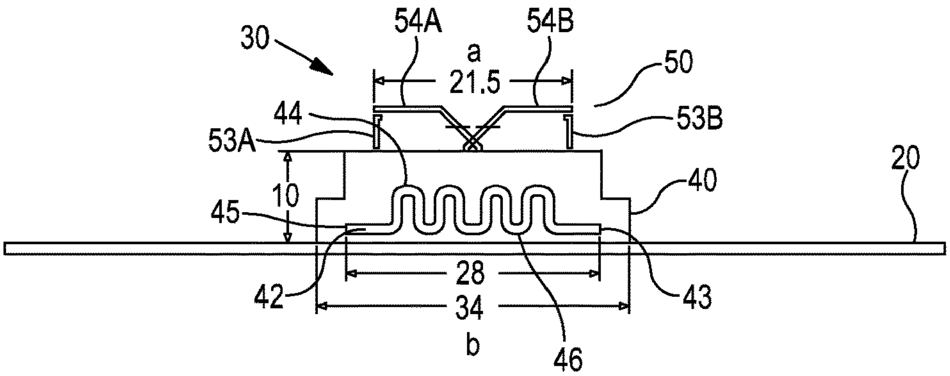
FIG. 5 shows another example embodiment of the subject matter described herein.

Referring to FIG. 5, a length of the slot 42 (line integral along its length, as opposed to distance between its ends) can in some examples be substantially equal to one half of a wavelength λR that corresponds to frequency fR.

In this example, the slot 42 is a closed slot 42 comprising a first pair of elongate opposing sides 44, 46 that are separated width wise and extend in parallel for a length of the slot 42 and a second pair of shorter sides that are separated lengthwise and extend for a width of the slot 42. In this context, a closed slot, is an aperture in a conductive member that has a perimeter that loops wholly within the conductive member. The aperture is circumscribed (surrounded) by conductive material. There is a closed electrical path around the aperture.

In this example, the slot 42 has a length that is longer than a width of the support 40. The slot 42 meanders so that it fits within the support 40. The width of the support 40 can thus be reduced in comparison to use of a straight slot 42.

The slot 42 provides a choking effect or high impedance and reduces return currents coupled to the main ground plane 20 and returning to the ports 52 via the support 40. The slot 42 directs any return currents on the support 40 away from the ports 52A, 52B.

Figure 6:
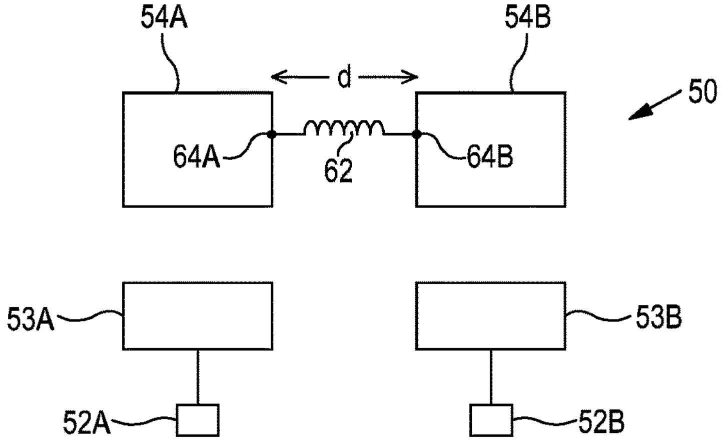
FIG. 6 shows another example embodiment of the subject matter described herein.

FIG. 6 illustrates an example of a multi-port antenna 50. The multi-port antenna 50 comprises a first antenna element 54A coupled to the first port 52A, a second antenna element 54B coupled to the second port 52B and, optionally an impedance element 62 that is connected between the first antenna element 54A and the second antenna element 54B.

The impedance element 62 can be a passive reactive component that has inductance and/or capacitance. The impedance element 62 can be or can comprise a resistive component that has resistance. The impedance element 62 can be a lumped component or an arrangement of lumped components. A lumped component is an electronic component having solder pads. It can be provided on tape and reel. A lumped component can be hand soldered to the antenna 50 or machine placed and reflow soldered in an oven. The impedance element 62 can be or can comprise a distributed component, for example, a microstrip/stripline/coplanar waveguide.

An impedance element 62, either lumped or distributed, can comprise a certain amount of resistance, inductance and capacitance. The behavior of such an impedance element 62 varies with respect to frequency such that although it is referred to as an inductor, at some frequencies it may behave as a capacitor at other frequencies. Additionally, in some examples, varying amounts of resistance can also be provided at different frequencies.

In the example illustrated the impedance element 62 is an inductor coil.

In some examples, the multi-port antenna 50 comprising the first antenna element 54A and the second antenna element 54B can be self-balanced, that is balanced without the presence of an impedance element 62.

In some examples, the multi-port antenna 50 comprising the first antenna element 54A and the second antenna element 54B can be balanced by the impedance element 62. In this example, the multi-port antenna 50 without the impedance element 62 is unbalanced.

The first antenna element 54A and the second antenna element 54B are spaced apart by a distance d and they are closest at a point-of-closest-approach 64.

The first antenna element 54A and the second antenna element 54B can be operated independently.

In this example, the impedance element 62 is connected to the first antenna element 54A at or near the point-of-closest-approach 64A of the first antenna element 54A and connected to the second antenna element 54B at or near the point-of-closest-approach 64B of the second antenna element 54B.

The first antenna element 54A operates with the first antenna pattern. The second antenna element 54B operates with the second antenna pattern, different to the first antenna pattern.

The first port 52A provides a first feed for the first antenna element 54A. The first feed, when a first indirect feed, comprises a first coupling element 53A that is galvanically isolated from and capacitively coupled to the first antenna element 54A. The first coupling element 53A can be galvanically connected to the first port 52A or connected to port 52A through an impedance matching circuit.

The second port 52B provides a second feed for the second antenna element 54B. The second feed, when a second indirect feed, comprises a second coupling element 53B that is galvanically isolated from and capacitively coupled to the second antenna element 54B. The second coupling element 53B can be galvanically connected to the second port 52B or connected to port 52A through an impedance matching circuit.

The first antenna element 54A and the second antenna element 54B can partially overlap without touching (see FIG. 7) or can be non-overlapping but close together.

Balance between the first antenna element 54A and the second antenna element 54B can be achieved by using the impedance element 62. In some examples, it is also or alternatively achieved by design of the first coupling element 53A and/or second coupling element 53B and/or antenna element 54A and/or antenna element 54B. It is possible to create a self-balancing antenna structure without the use of impedance element 62

The slot 42 in the support 40 (illustrated in FIG. 5) provides a choking effect and reduces return currents via the support 40 (as previously described). The slot 42 directs any return currents on the support 40 away from the coupling elements 53A, 53B.

Figure 7:
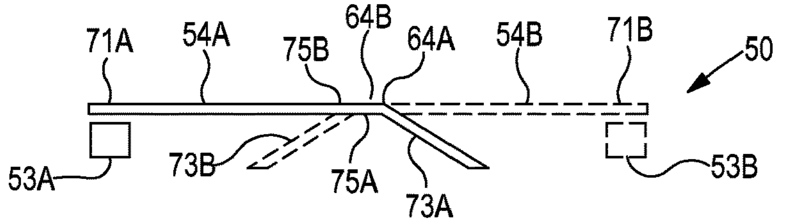
FIG. 7 shows another example embodiment of the subject matter described herein.

FIG. 7 illustrates an example of a multi-port antenna 50 of FIG. 6.

The first antenna element 54A and the second antenna element 54B are spaced apart by a distance d and they partially overlap without touching at a cross-point 64A, 64B (point-of-closest-approach). The first antenna element 54A and the second antenna element 54B can be operated independently.

In this example, the impedance element 62 is connected to the first antenna element 54A at or near the cross-point 64A of the first antenna element 54A and connected to the second antenna element 54B at or near the opposing cross-point 64B of the second antenna element 54B. The cross-points 64A, 64B identify overlapping areas of the first antenna element 54A and the second antenna element 54B.

The first antenna element 54A is a resonant element and has a first operational bandwidth. The second antenna element 54B is a resonant element and has a second operational bandwidth.

In some but not necessarily all examples, the first and second operational bandwidths overlap. The first antenna element 54A and the second antenna element 54B can have the same resonant mode. The resonant mode can, for example, be a quarter wavelength resonant mode, a half wavelength resonant mode or a full wavelength resonant mode.

Figure 8:
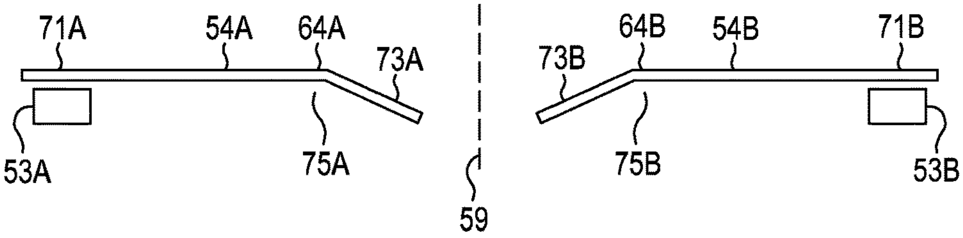
FIG. 8 shows another example embodiment of the subject matter described herein.

The multi-port antenna 50 illustrated in FIG. 7 has been separated into sub-components in FIG. 8, to better illustrate the spatial relationship of the first antenna element 54A and the second antenna element 54B in FIG. 7.

Each of the first antenna element 54A and the second antenna element 54B has a same shape and are arranged with different handedness (chirality). When viewed from a side-on perspective (FIG. 7, 8), the first antenna element 54A bends clockwise whereas the second antenna element 54B bends counter-clockwise. The bending reduces coupling/overlap between the first antenna element 54A and the second antenna element 54B.

The first antenna element 54A and the second antenna element 54B are asymmetric.

It can be seen that first antenna element 54A and the second antenna element 54B are, in the example illustrated, mirror images of each other (FIG. 8) that have been moved relative to one another in a plane orthogonal to the plane of reflection 59 so that they are parallel but overlap (FIG. 7). In other examples, the first antenna element 54A and the second antenna element 54B could have different shapes, for example, to have different operational bandwidths.

The first antenna element 54A has a first length, and the second antenna element 54B has a second length. The first length can be the same or can be different to the first length.

The first antenna element 54A is bent, such that a part 71A of the first antenna element 54A is parallel to the ground plane 20 and a part 73A of the first antenna element 54A is not parallel to the ground plane 20, causing a projection of the first antenna element 54A onto the ground plane 20 to be shortened. The bend shortens the projected length.

The second antenna element 54B is bent, such that a part 71B of the second antenna element 54B is parallel to the ground plane 20 and a part 73B of the second antenna element 54B is not parallel to the ground plane 20, causing a projection of the second antenna element 54B onto the ground plane 20 to be shortened. The bend shortens the projected length.

The separation between the first port 52A and the second port 52B is, in this example, less than the first length and less than the second length. The ports 52A, 52B could be farther apart than the combined length of the elements. This depends on the shape of the coupling elements 53A, 53B.

Each of the first antenna element 54A and the second antenna element 54B comprises: a ramp section 73, a bend section 75 and an extending section 71, wherein the ramp section 73 rises to the bend section 75 where the antenna element 54 bends to form the extending section 71 that extends parallel to the ground plane 20. The description of a ramp section 73, a bend section 75 and an extending section 71 includes the possibility of a single curved part which provides both the ramp section 73, and the bend section 75 as a single curving section.

The first antenna element 54A comprises: a first ramp section 73A, a first bend section 75A and a first extending section 71A. The first ramp section 73A rises to the first bend section 75A where the antenna element 54A bends to form the extending section 71A that extends parallel to the ground plane 20.

The second antenna element 54B comprises: a second ramp section 73B, a second bend section 75B and a second extending section 71B. The second ramp section 73B rises to the second bend section 75B where the antenna element 54B bends to form the second extending section 71A that extends parallel to the ground plane 20.

The cross-overs points 64A, 64B are at or near the bend sections 75A, 75B as illustrated in FIG. 7.

As can be seen from FIG. 5, the ramp section rises from a flat plane, parallel to the ground plane 20, defined by an edge of the support 40 to the bend section. The bend section is at a parallel flat plane that is parallel to but spaced from the flat plane. The antenna element bends at the bend section to form the extending section that extends within the parallel flat plane.

Although in the example illustrated in FIG. 5, the first antenna element and the second antenna element extend beyond the support 40 in the first direction so that the support 40 does not extend between the first antenna element and the second antenna element at the cross-over, in other examples an insulating substrate of the support 40 can extend between the first antenna element 54A and the second antenna element 54B at the cross-over 64A, 64B. For example, the multi-port antenna 50 and the support 40 can share a common supporting substrate, as previously described.

Referring back to FIGS. 7 and 8, the extending sections 71A, 71B each terminate at an end. The ramp section 73A, 73B extends, while rising towards the end of the radiator section 71A, 71B.

An angle is formed between the ramp section 73A, 73B and the extending section 71A, 71B on the support-side. This could be a 90o angle, however, an obtuse angle reduces overlap/coupling between the ramp sections 73A, 73B.

The ramp sections 73A, 73B are, in at least some examples, galvanically connected to conductive portions of the support 40 that are galvanically connected to the ground plane 20. In another embodiment, 73A and 73A could be connected to the conductive portions of the support 40 via a lumped component(s) (inductor and/or capacitor) to force the element into resonance at the desired frequency. If the antenna element is not at natural resonance at that frequency.

In some but not necessarily all examples, an impedance element (not illustrated in FIGS. 7, 8) can extend between the first antenna element 54A and the second antenna element 54B. It can, for example, extend between the points-of-closest approach 64A, 64B.

In the examples illustrated in FIGS. 7 and 8, the bend section 75A, 75B is an elbow.

An obtuse angle is formed between the ramp section 73A, 73B and the extending section 71A, 71B on the support-side. The coupling element 53A, 53B is associated with the extending section 71A, 71B proximal to the free-end.

In some but not necessarily all examples the first coupling element 53A, and the first antenna element 54A lie in a first plane (FIG. 8—left) and the second coupling element 53B, and the second antenna element 54B lie in a second plane (FIG. 8—right).

When arranged as illustrated in FIG. 7, for use, the first plane is parallel to the second plane and spaced from the second plane by the distance d. The first antenna element 54A and the second antenna element 54B overlap.

In other examples, the first antenna element 54A and the second antenna element 54B do not overlap. In these examples, the first plane is parallel to the second plane. It may be co-planar with the second plane or spaced from the second plane.

In some but not necessarily all examples, the first antenna element 54A is substantially two-dimensional. The ramp section 73A is linear and the extending section 71A is linear and aligned with the ramp section 73A. In some but not necessarily all examples, the second antenna element 54B is substantially two-dimensional. The ramp section 73B is linear and the extending section 71B is linear and aligned with the ramp section 73B.

In the examples illustrated in FIGS. 7 and 8, there is one bend section 75A, 75B, one ramp section 73A, 73B and one extending section 71A, 71B. In other examples, the antenna element 54A, 54B comprises more than one ramp section 73A, 73B that ramp up and ramp down, more than one extending section 71A, 71B and more than one bend section 75A, 75B.

In some examples, the angle of ramp section 73A, 73B can be different. In some examples, it can be perpendicular to the extending section 71A, 71B.

In some but not necessarily all examples, the antenna element 54 is substantially three-dimensional and comprises additional ramp sections 73A, 73B ramping left and right (compared to up and down), more than one extending section 71A, 71B and more than one bend section 75A, 75B.

FIGS. 9A to 11C illustrate feeds to a first port 52A and a second port 52B. The first port 52A and the second port 52B can be ports of the same antenna module 30 or ports of different antenna modules 30. The one or more antenna modules 30 can be as previously described.

For example each antenna module 30 can comprise: a support 40 positioned within the perimeter 22 of the ground plane 20 and extending outwardly from the ground plane 20; a multi-port antenna 50 supported by the support 40 at a distance from the ground plane 20 wherein the multi-port antenna 50 has a different radiation pattern associated with each port 52; wherein the at least one support 40 comprises a slot 42 positioned between the multi-port antenna 50 and the ground plane 20.

Figure 9A:
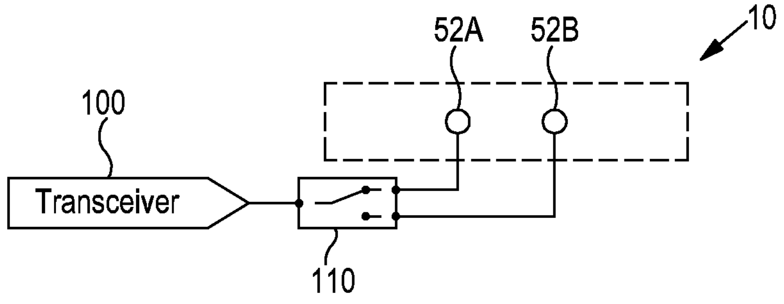
FIG. 9A to 9C show other example embodiments of the subject matter described herein.

In FIG. 9A, a transceiver 100 is connected via a radio frequency switch 110 to first and second ports 52A, 52B. The switch 110 is a single-pole double-terminal (1P2T) switch. One of the terminals of the switch 110 is interconnected to the first port 52A and the other of the terminals of the switch 110 is interconnected to the second port 52B. The radio frequency switch 110 controls use of the first port 52A and use of the second port 52B.

Figure 9B:
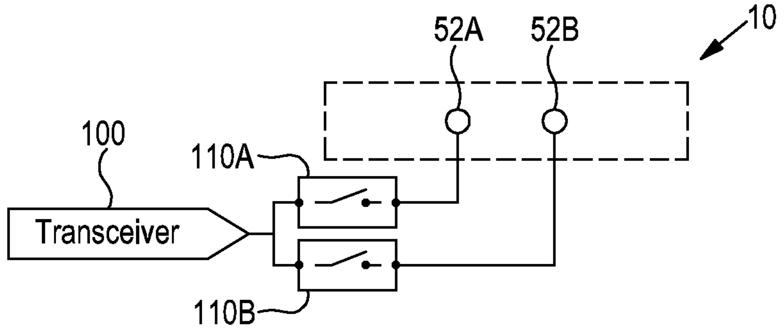

In FIG. 9B, a transceiver 100 is connected via one radio frequency switch 110A to the first port 52A and is connected via a different radio frequency switch 110B to the second port 52B. The switch 110A is a single-pole single-terminal (1P1T) switch. The switch 110B is a single-pole single-terminal (1P1T) switch. Either one or both of the ports 52A, 52B are interconnected via the switches 110A, 110B to the transceiver 100. The radio frequency switches 110A, 110B control use of the first port 52A and use of the second port 52B. The ports 52A, 52B can thus be directly interconnected by switches 110A, 110B.

Figure 9C:
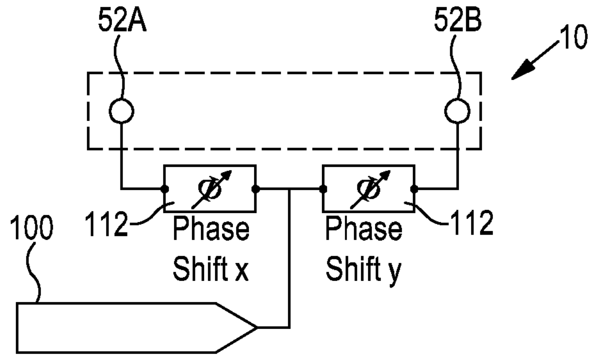

In FIG. 9C, a transceiver 100 is connected without a switch to the first port 52A and is connected without a switch to the second port 52B of a multi-port antenna 50. A phase change ϕ is introduced between the first port 52A and the second port 52B. The ports 52A, 52B are directly combined (without using a power combiner/splitter). In this example, one or more phase shifters 112 are used to introduce the phase shift.

Figure 10A:
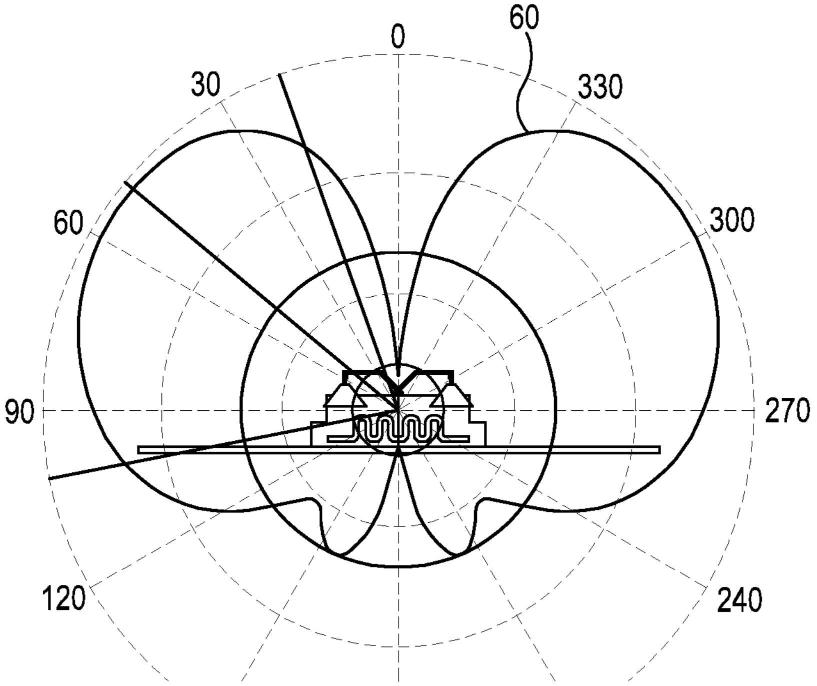
FIGS. 10A and 10B show other example embodiments of the subject matter described herein.
Figure 10B:
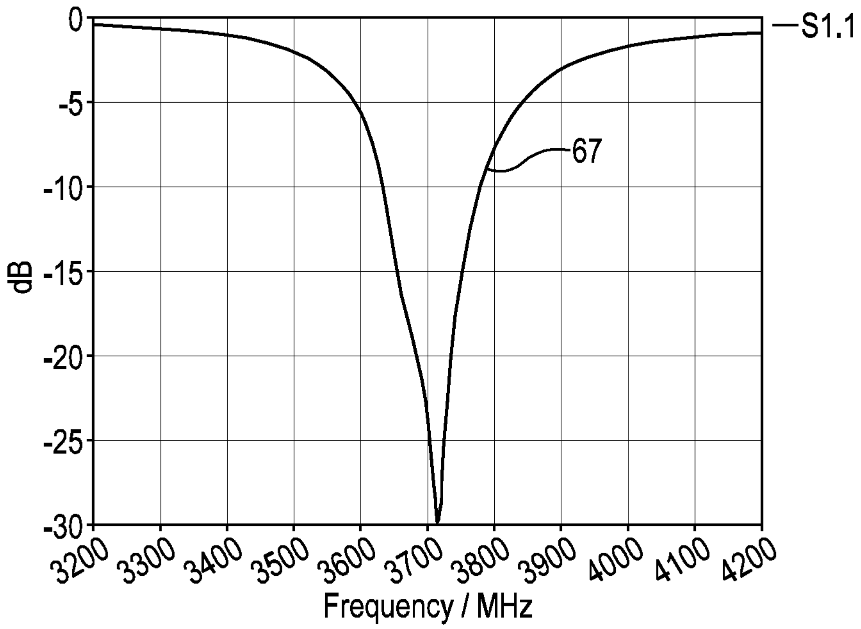

FIG. 10A illustrates an example of a far-field radiation pattern 60 formed when both the first port 52A and the second port 52B of the same antenna module 30 are used simultaneously. FIG. 10B illustrates an example of the parameter S11 when the two ports 52A, 52B are directly combined creating a third radiation pattern.

Figure 11A:
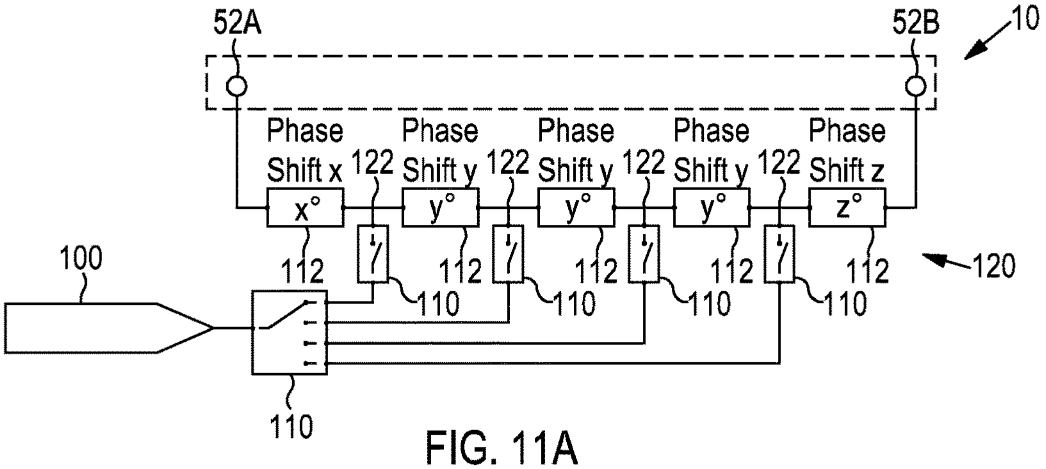
FIG. 11A to 11C show other example embodiments of the subject matter described herein.
Figure 11B:
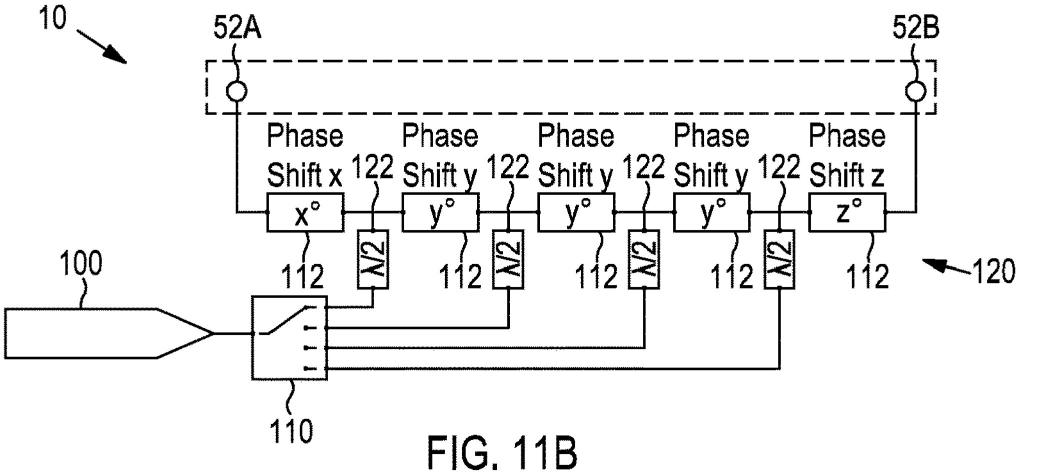

Tunable phase shifters can be lossy. In FIG. 11A and FIG. 11B a phase shifter 112 is provided by a feed point 122 at a physical distance along a transmission line 120. The transmission line 120 comprises one or more feed points 122 along a length of the transmission line 120 and interconnects lengthwise the ports 52A, 52B. The phase shift can be changed by selecting a different feed point 122. The physical distance along the transmission line 120 of the selected feed point 122 controls the phase shift between ports 52A, 52B interconnected by the transmission line 120. One or more switches 110 are used to select the feed point 122.

The example illustrated in FIG. 11B uses a switch 110 (1P4T) for selection of a feed point 122 and a switch 110 for each feed point 122 for interconnection to the feed point 122. It can be suitable for broad band use. The example illustrated in FIG. 11B uses a switch 110 (1P4T) for selection of a feed point 122 and does not use a switch 110 for each feed point 122 for interconnection to the feed point 122. It can be suitable for a narrow band use.

In FIG. 11B, a half wavelength transmission line is connected between each feed point 122 and its respective terminal of the switch 110. An open half wavelength transmission line provides an infinite impedance when left open at an unselected terminal of the switch 110. An alternative option would be to use a quarter wavelength transmission line but short to ground at the unselected terminals of the switch 110. Transmission lines can be replaced, in whole or in part, by lumped reactive networks comprising inductor(s) and capacitor(s).

Figure 11C:
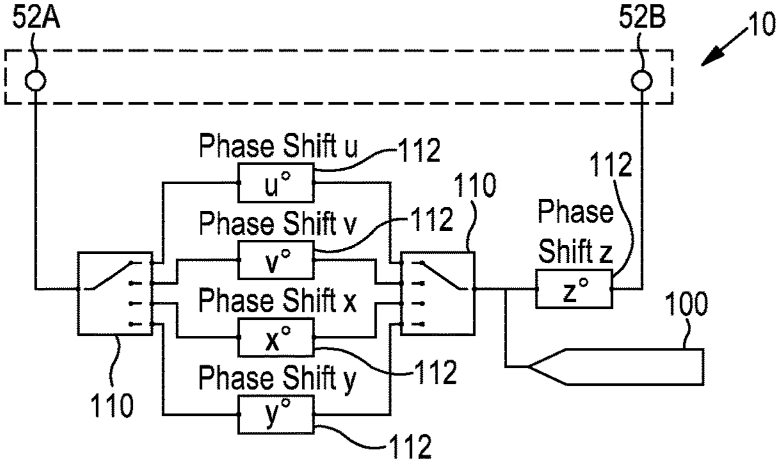

In FIG. 11C a pair of switches 110 (IP4T) is used to select a phase shift between the ports 52A, 52B. The phase shifters 112 are in parallel between the two switches 110. One switch 110 selects an input to a particular phase shifter 112. Another switch 110 selects an output from that particular phase shifter 112. The phase shifters 112 can, for example, be provided by selecting different lengths of a transmission line 120 (and/or different lumped components).

The number of phase shifts in the examples of FIGS. 11A, 11B, 11C is limited to 4, but it could be any number.

Figure 12A:
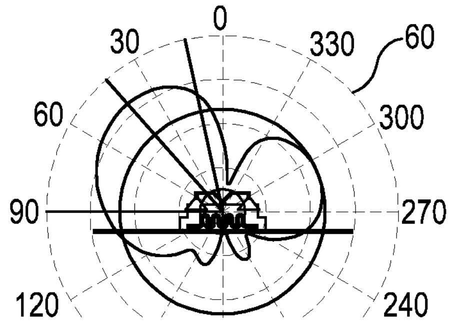
FIG. 12A to 12F show other example embodiments of the subject matter described herein.
Figure 12B:
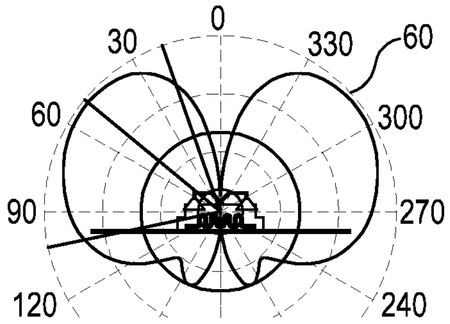
Figure 12C:
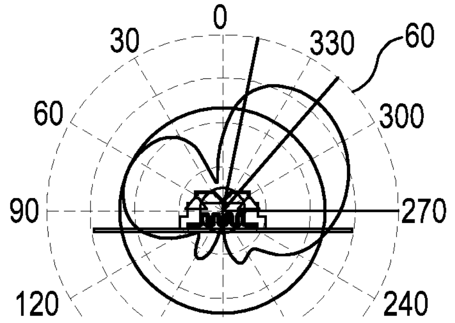
Figure 12D:
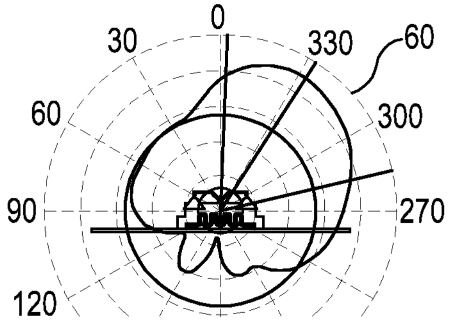
Figure 12E:
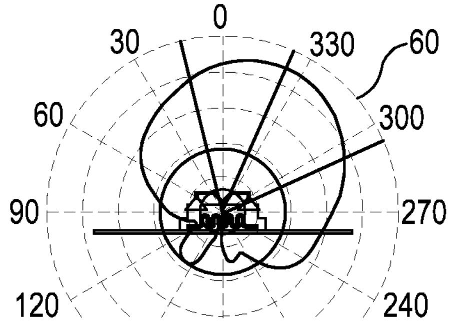
Figure 12F:
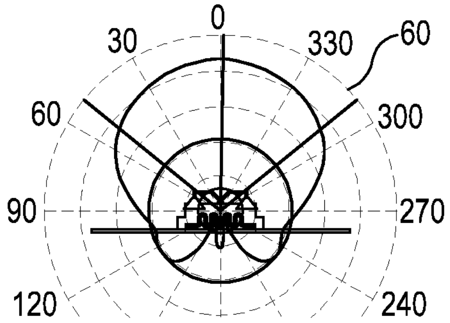

FIGS. 12A, 12B, 12C, 12D, 12E, 12F illustrate different radiation patterns 60 obtained when using different phase shifts between the ports 52A, 52B of the same or different antenna modules 30. The FIGs illustrate radiation patterns 60 provided by different selected phase off sets between the ports 52A, 52B. FIG. 12A illustrates a radiation pattern 60 for a phase offset of −45o. FIG. 12B illustrates a radiation pattern 60 for a phase offset of 0o. FIG. 12C illustrates a radiation pattern 60 for a phase offset of +45o. FIG. 12D illustrates a radiation pattern 60 for a phase offset of 90o. FIG. 12E illustrates a radiation pattern 60 for a phase offset of 135o. FIG. 12F illustrates a radiation pattern 60 for a phase offset of 180o. One or more radio frequency switches 110 control use of the first port 52A and use of the second port 52B by selecting a phase offset and radiation pattern 60.

FIGS. 13, 14A, 14B, 15, 16 illustrate different examples of an array 200 of multiple antenna modules 30. Each antenna module has ports 52A, 52B. Different pairs of ports 52A, 52B from different pairings of antenna modules can be used simultaneously, for example as described with reference to FIGS. 9A-C, 10A-B, 11A-C and 12A-F.

The antenna modules 30 share the same ground plane 20. The arrays 200, in these examples, are two dimensional arrays. Each antenna module 30 extends outwardly from a same side of the ground plane 20 in the same direction. Each antenna module 30, in these examples, extends outwardly from the same side of the ground plane 20 in the same direction by substantially the same distance. In these examples, each support 30 has a height h. The height h can be the same or different for different modules 30 and for different supports 30.

In the examples, the antenna modules 30 are aligned in one of two orthogonal directions (x-direction, y-direction). If an antenna module is aligned in one direction then its antenna elements 54 are aligned in that direction.

The antenna modules 30 are arranged spatially in a pattern to form the array 200. The pattern has 180o rotational symmetry. In some examples the pattern additionally has 90o rotational symmetry.

The centers of the antenna modules 30 are regularly spaced.

Figure 13:
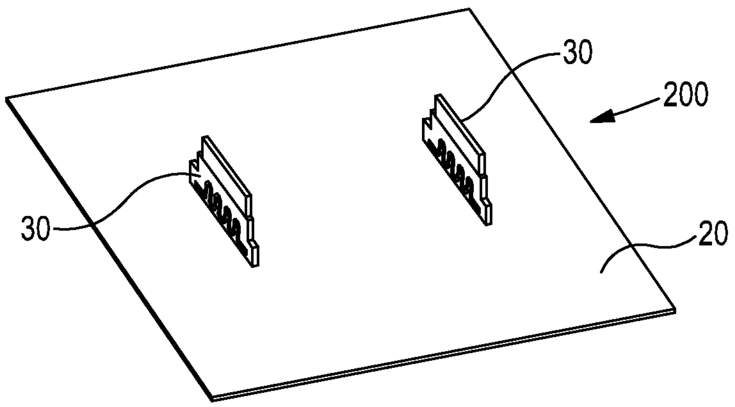
FIG. 13 shows another example embodiment of the subject matter described herein.

In FIG. 13, two antenna modules 30 are aligned in the same direction and are positioned in opposition.

Figure 14A:
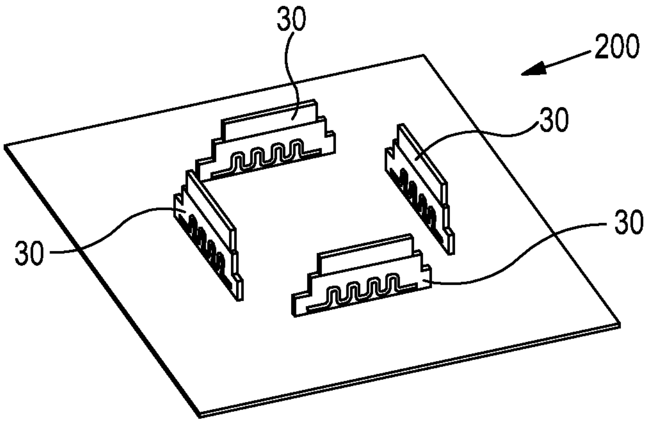
FIG. 14, 14B show other example embodiments of the subject matter described herein.
Figure 14B:
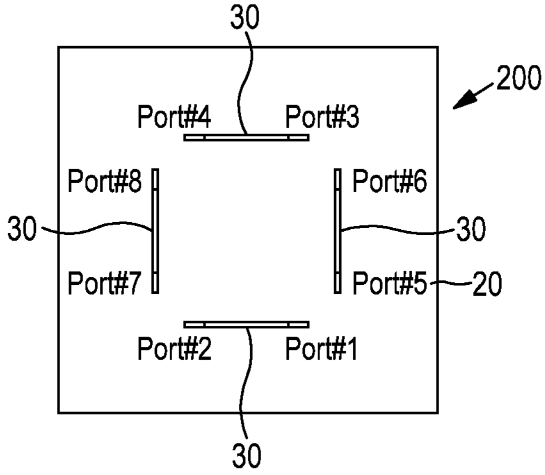

In FIG. 14A, 14B a first pair of antenna modules 30 are aligned in the same direction (x-direction) and are positioned in opposition and a second pair of antenna modules 30 are aligned in the same, different direction (y-direction) and are positioned in opposition. The directions x, y are orthogonal. The separation distance between the first pair of antenna modules 30 is the same as the separation distance between the second pair of antenna modules 30. The antenna modules 30 are aligned with sides of a square.

Figure 15:
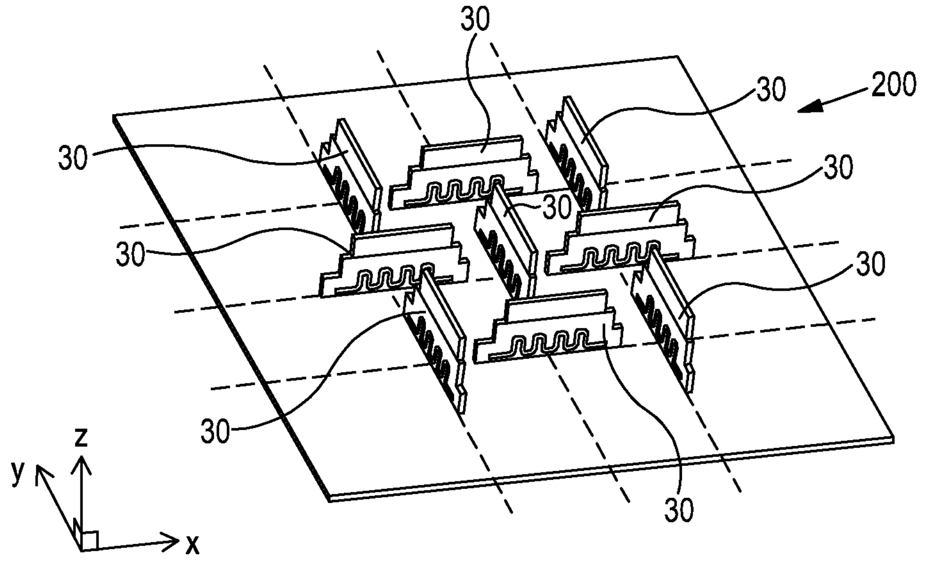
FIG. 15 shows another example embodiment of the subject matter described herein.

In FIG. 15 a first set of antenna modules 30 are aligned in the same direction (y-direction) and a second set of antenna modules 30 are aligned in the same, different direction (x-direction). The directions x, y are orthogonal. The separation distance between centers of the antenna modules 30 of the first set is the same. The separation distance between centers of the antenna modules 30 of the second set is the same. The separation distance between centers of the antenna modules 30 of the first set is the same as the separation distance between centers of the antenna modules 30 of the second set. The centers of the antenna modules 30 are arranged on a regular 3×3 grid. The arrangement of the antenna modules 30 is interleaved. The first set of antenna modules 30 are at (x,y) positions (0,0), (0,2), (1,1), (2,0), (2,2). The second set of antenna modules 30 are at (x,y) positions (0, 1) (1,0) (1,2) (2,1).

Figure 16:
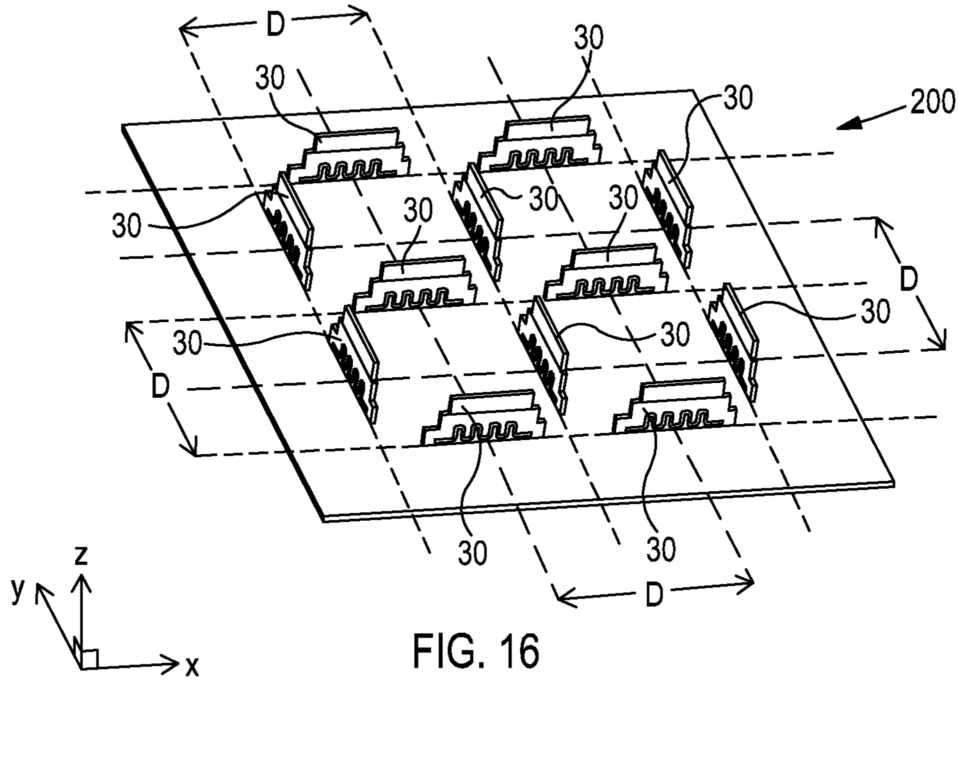
FIG. 16 shows another example embodiment of the subject matter described herein.

In FIG. 16 a first set of antenna modules 30 are aligned in the same direction (parallel to the y-direction) and a second set of antenna modules 30 are aligned in the same, different direction (parallel to the x-direction). The directions x, y are orthogonal. The separation distance between centers of the antenna modules 30 of the first set is the same. The separation distance between centers of the antenna modules 30 of the second set is the same. The separation distance between centers of the antenna modules 30 of the first set is the same as the separation distance between centers of the antenna modules 30 of the second set.

The centers of the antenna modules 30 of the first set are arranged on a first grid that is a 2 row×3 column grid, where the rows run parallel with the x-direction and the columns run parallel with the y-direction. The centers of the antenna modules 30 of the second set are arranged on a second grid that is a 3 row×2 column grid, where the rows run parallel with the x-direction and the columns run parallel with the y-direction. The first grid and the second grid are spatially offset.

The origin of the first grid is at (x,y) position (0,D/2). The first set of antenna modules 30 (aligned parallel to the y-direction) are at (x,y) positions (0,0), (0, 1), (1,0), (1, 1), (2,0), (2, 1) in the first grid relative to the offset origin of the first grid.

The origin of the second grid is at (x,y) position (D/2, 0). The second set of antenna modules 30 (aligned parallel to the x-direction) are at (x,y) positions (0,0), (0, 1), (0, 2), (1,0), (1, 1), (1, 2) in the second grid relative to the offset origin of the second grid.

FIGS. 13, 14A, 14B, 15, 16 illustrate different examples of an array 200 of multiple antenna modules 30. Each array may be a molded composite structure.

Each array may be formed from a combination of sub-arrays, each sub-array being a molded composite structure. As previously described, a molded composite structure can comprise insulating portions and conductive portions. Multiple multi-port antennas 50 and their supports 40 and a portion of the ground plane 20 can be a single component used as a sub-array. This single component can be formed from a molded composite structure.

Figure 17:
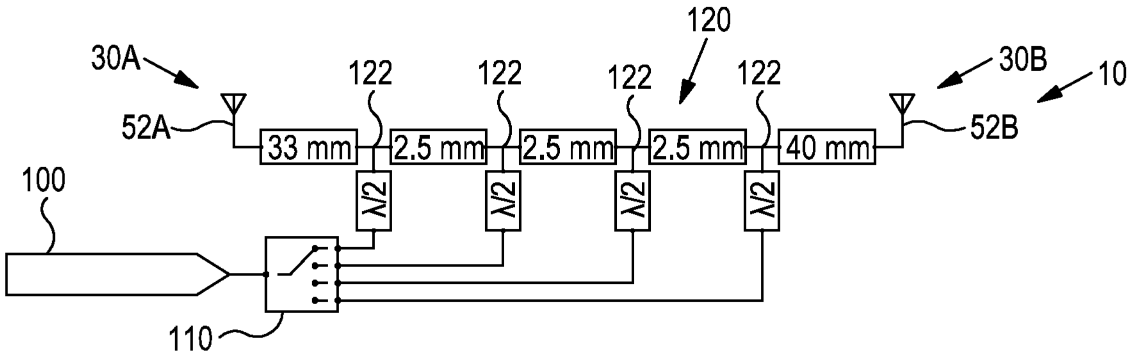
FIG. 17 shows another example embodiment of the subject matter described herein.

FIG. 17 illustrates an example of an apparatus 10 similar to that illustrated in FIG. 11B.

The different ports 52A, 52B are ports on different antenna modules 30. The two ports 52A, 52B are interconnected by a transmission line 120.

The transmission line 120 comprises one or more feed points 122 along its length and interconnects lengthwise the ports 52A, 52B of different antenna modules 30A, 30B. The ports that are connected are selected to have sufficient isolation.

Each feed point 122 is associated with a phase offset to the antenna port 52A and a phase offset to the antenna port 52B. The phase offset to the antenna port 52A for a particular feed point 122 is dependent upon a distance from that feed point 122 to the antenna port 52A. The phase offset to the antenna port 52B for that feed point 122 is dependent upon a distance from that feed point 122 to the antenna port 52B.

A switch 110 is used to select one of the feed points 122 for use. This selects a particular radiation pattern for use.

It should be noted that the transmission line 120 that interconnects the antenna modules 30A, 30B introduces a phase change and does not include a power combiner/divider.

Figure 18:
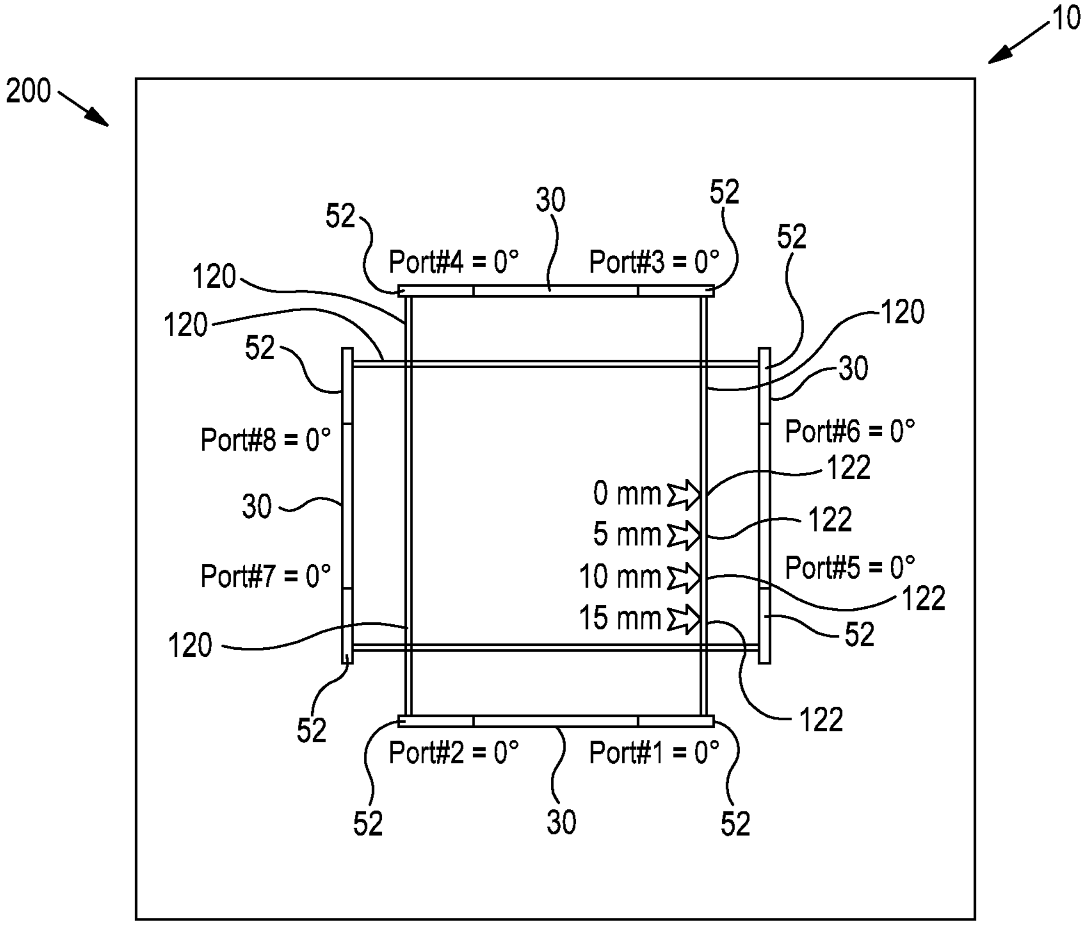
FIG. 18 shows another example embodiment of the subject matter described herein.

FIG. 18 illustrates an array 200 of antenna modules 30 as illustrated in FIG. 14B.

Transmission lines 120 interconnect lengthwise some of the ports 52 of different antenna modules 50. The ports 52 that are interconnected are selected to have sufficient isolation.

In this example, the interconnected antenna modules 30 are not directly adjacent nearest neighbors but are opposing. The interconnected antenna modules 30 are not the closest antenna modules 30.

Each transmission line 120 comprises one or more feed points 122 along its length. Each of the transmission lines 120 can be operated as described in FIG. 17.

In the previous examples, a single transceiver 100 has been used. It has been described how a single transceiver can be selectively operated to use multiple different radiation patterns 60. The selectivity can be achieved using a switch network comprising one or more switches 110 to select different ports 52 or combinations of ports 52 for use. The ports 52 can be on the same or different antenna modules 30. Different phase separation can be applied for simultaneously used ports 52, for example by selecting a feed point 122 on a transmission line 120 interconnecting ports 52 on different antenna modules 30.

Figure 19A:
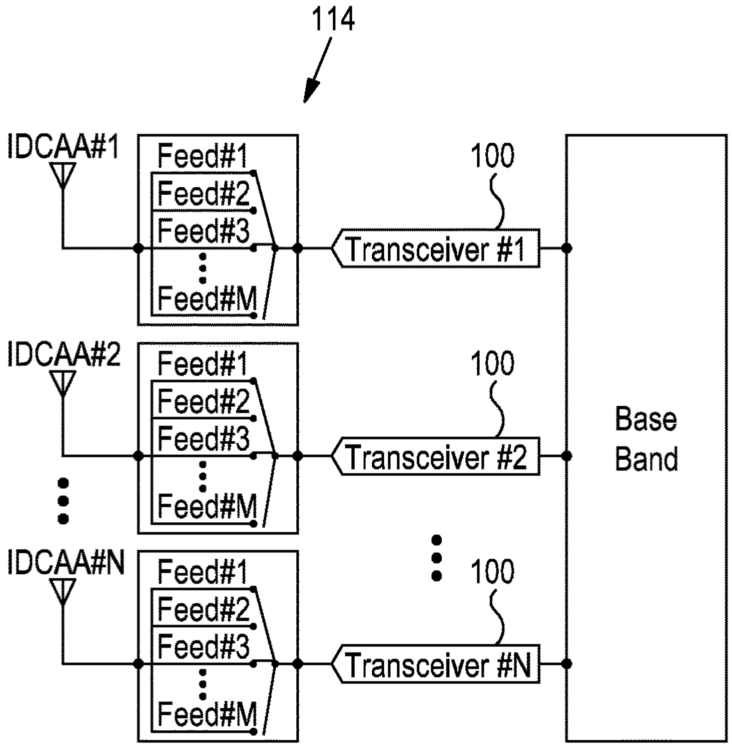
FIG. 19A, 19B show other example embodiments of the subject matter described herein.
Figure 19B:
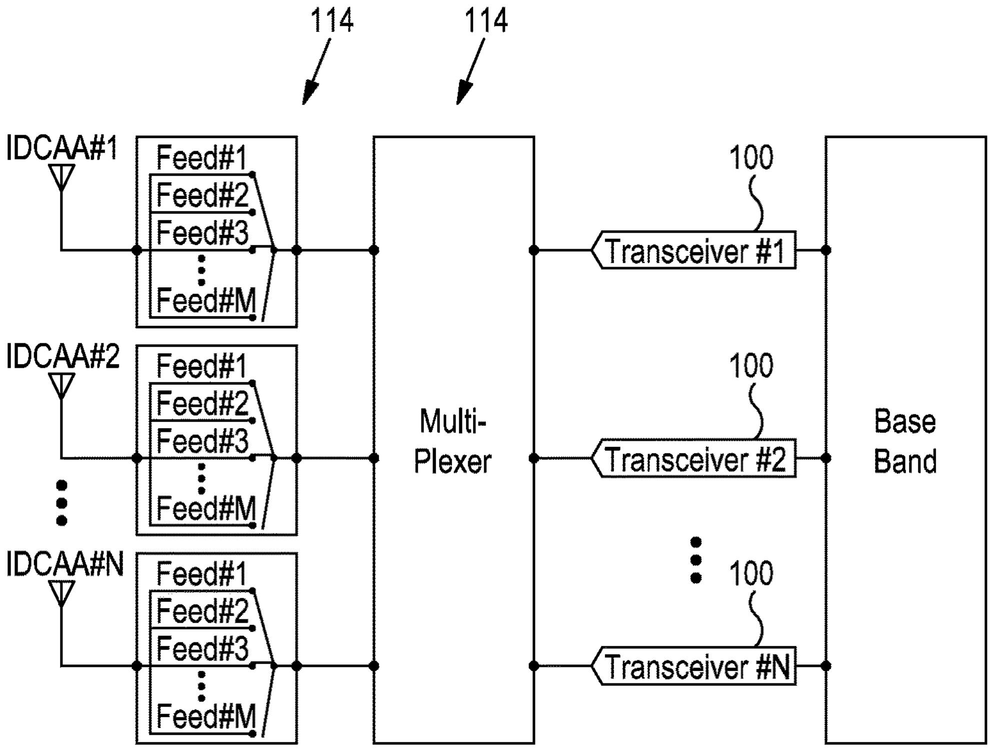

As illustrated in FIG. 19A, 19B, it is also possible to selectively use more than one transceiver 100. It is also possible to use more than one transceiver 100 simultaneously. A network 114 of radio frequency switches can be used for selectively interconnecting multiple radio transceivers 100 simultaneously to antenna modules 30.

The transceiver selectivity can be achieved using a switch network 114 comprising one or more radio frequency switches 110 to select different ports 52 and/or select different combinations of ports 52 for use by different transceivers 100.

A transceiver 100 may have a dedicated radiation pattern 60 or it can be selectively operated using multiple different radiation patterns. The selectivity of a radiation pattern 60 can be achieved using the switch network 114 to select different ports 52 or combinations of ports 52 for use by a transceiver 100. Different phase separation can be applied to the simultaneously used ports 52, for example by selecting a feed point on an interconnecting transmission line 120.

In some examples, the radiation pattern is determined by which ports 52 of which antenna modules 30 are used and what phase difference is applied between them. The switch network 114 of radio frequency switches 110 can be used for selecting a radiation pattern 60. The network of radio frequency switches selectively interconnects a radio transceiver to one or more ports 52 of one or more antenna modules 30 (with or without a specific phase delay).

In FIG. 19A, each transceiver 100 has exclusive access to a set of radiation patterns. In FIG. 19B, each transceiver 100 shares radiation patterns.

Referring back to FIG. 18, if the number of port interconnections 120 is N, the number of transceivers is T, and there are M different radiation patterns per interconnection then there are therefore M*(N^T) configurations for using the apparatus 10.

In this example there are 4 pairs of interconnected ports (N=4), the pairs are interconnected by transmission lines 120 each of which has M=4 feed points. There are therefore 4*(4^T) configurations of the apparatus 10. If a particular transceiver can be switched by a switch network 114 to use any of the M feed points 122 on any of the N interconnecting transmission lines 120 then there are N*M possible radiation patterns 60 available for use by that transceiver 100.

In the foregoing examples, and in the claims reference is made to a transceiver. A transceiver is circuitry that can operate as a receiver, as a transmitter or as a transmitter and a receiver. A transceiver can be a full-duplex transceiver that can operate simultaneously as a transmitter and a receiver.

In some examples, a transceiver can be replaced by a transmitter or by a receiver or by a combination of transmitters and/or receivers.

When an apparatus 10 is receiving, multiple different radiation patterns 60 can be in simultaneous use. In MIMO, signals from different transmitters (multiple input MI to the air interface) that are transmitted simultaneously are received using different radiation patterns 60 (multiple output MO from the air interface). In reception diversity, signals from the same transmitter (single input SI to the air interface) are received using different radiation patterns 60 (multiple output MO from the air interface).

When an apparatus 10 is transmitting, multiple different radiation patterns 60 can be in simultaneous use. In MIMO, a signal is transmitted simultaneously using different radiation patterns 60 (multiple input MI to the air interface). In transmission diversity, the same signal is transmitted simultaneously (or in different time slots) using different radiation patterns 60 (multiple input MI to the air interface).

The apparatus 10 can transmit and receive at the same time at the same frequency (full duplex operation).

The apparatus 10 can transmit and receive at different times (time division duplex).

The apparatus 10 is able to operate using multiple selectable radiation patterns 60. There are more radiation patterns than transceivers 100. Radio frequency switches 110 can be used for selecting a radiation pattern, thereby reducing losses. The insertion loss from the switches can be less than 1 dB.

The apparatus 10 enables parallel transceiver chains in simultaneous operation. It is expected that the apparatus 10 will find application in the 3GPP New Radio and other implementations of 5G.

It is expected to have particular benefits for Enhanced mobile broadband (eMBB), Ultra reliable and low latency communication (URLLC) and Massive machine type communications (eMTC).

The apparatus 10 can transmit (and/or receive) different data messages on different transmit (and/or receive) chains to increase throughput.

The apparatus 10 can transmit (and/or receive) the same data messages on different transmit (and/or receive) chains to increase probability of reception.

The apparatus 10 is robust in dynamic wireless environments that have multipath fading, interference, and physical changes e.g. movement of people, objects.

The apparatus 10 is suitable for indoor and/or outdoor use.

The apparatus 10 is resistant to jamming/interference.

The apparatus 10 can dynamically select which antenna pattern(s) 60 are used to optimize performance.

There can be enhanced antenna gain via reception diversity using one or multiple transceivers. There can be enhanced antenna gain via beam forming using one or multiple transceivers.

There can be enhanced performance via transmission diversity using one or multiple transceivers.

There can be enhanced performance via beam forming using one or multiple transceivers.

A death grip can be avoided for user equipment and other handheld equipment. A death grip is when a user puts their fingers/hand near an antenna and detunes it.

Figure 20:
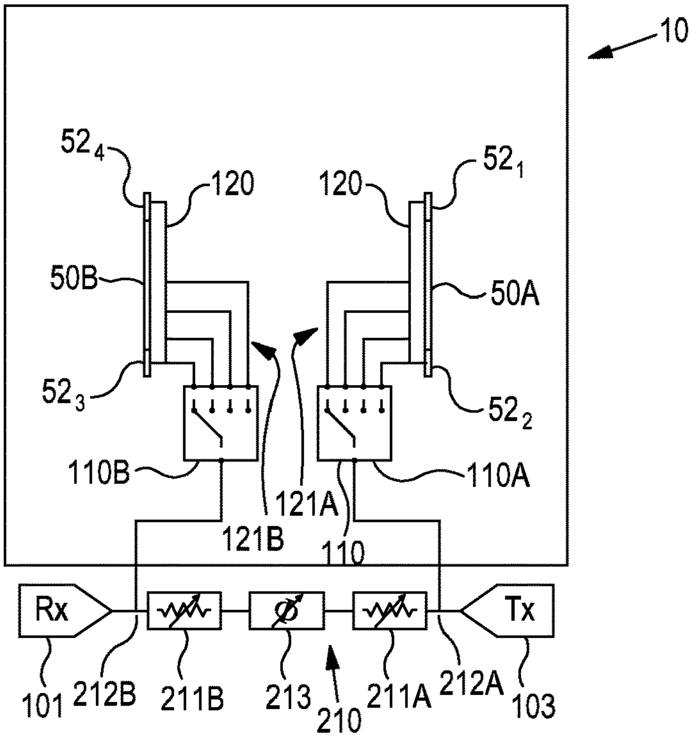
FIG. 20 shows another example embodiment of the subject matter described herein.
Figure 21:
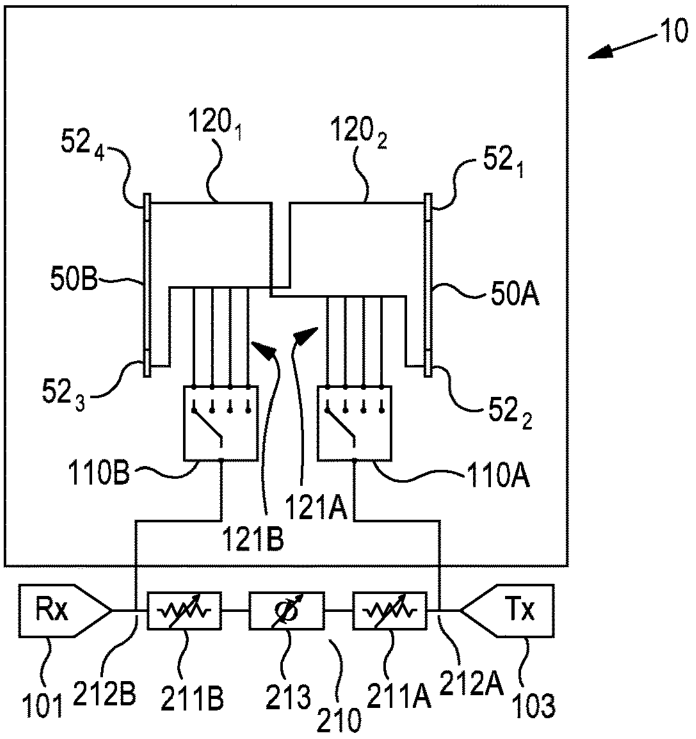
FIG. 21 shows another example embodiment of the subject matter described herein.
Figure 23:
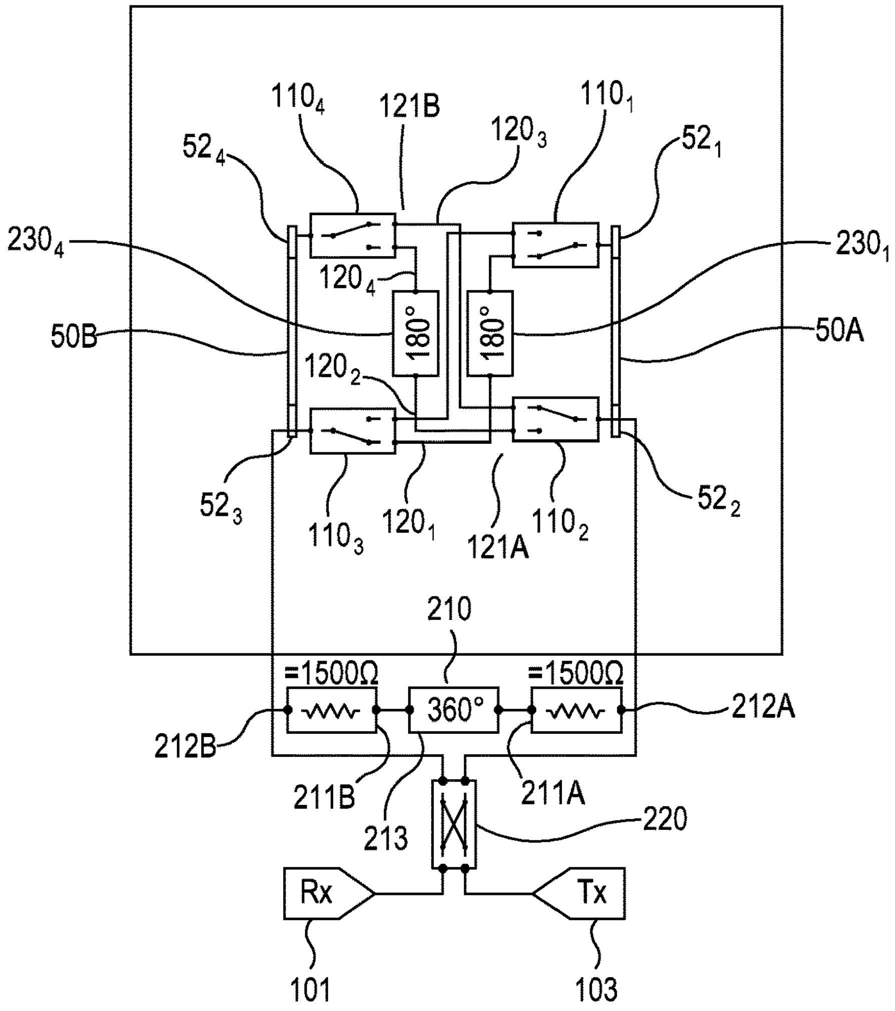
FIG. 23 shows another example embodiment of the subject matter described herein.

FIGS. 20, 21 and 23 illustrate examples of an apparatus 10 comprising a first multi-port antenna 50A and a second multi-port antenna 50B.

The first multi-port antenna 50A operates with a first radiation pattern when a first port 521 is used and operates with a second radiation pattern, different to the first radiation pattern, when a second port 522, different to the first port 521, is used.

The second multi-port antenna 50B operates with a third radiation pattern when a third port 523 is used and operates with a fourth radiation pattern, different to the third radiation pattern, when a fourth port 524, different to the third port 523, is used.

In these examples, but not necessarily all examples, the first port 521 faces the fourth port 524, and the second port 522 faces the third port 523.

There are two nodes 212A, 212B. The node 212A can be coupled to transmitter circuitry at node 103 or receiver circuitry at node 101. The node 212B can be coupled to transmitter circuitry node 103 or receiver circuitry node 101. The apparatus 10 can operate in full duplex mode where one of the nodes 212A, 212B is coupled to a transmitter node 103 and the other of the nodes 212A, 212B is coupled to a receiver node 101. The transmitter node 103 and the receiver node 101 can operate simultaneously in the same or overlapping operational frequency bands.

Figure 22:
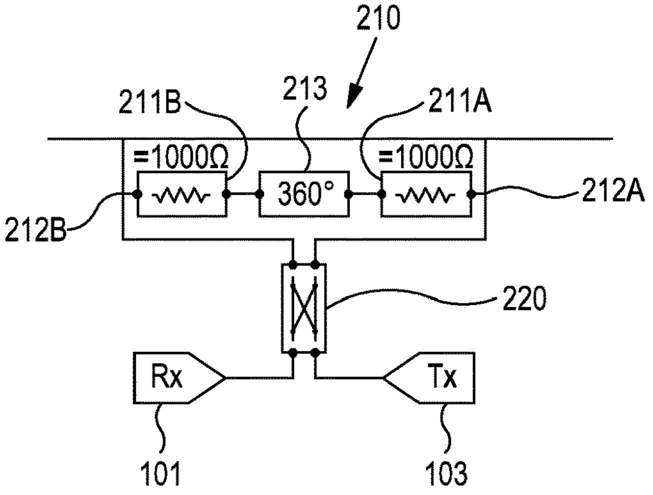
FIG. 22 shows another example embodiment of the subject matter described herein.

Optionally, an analogue signal interference cancellation (SIC) circuit 210 is coupled between the nodes 212A, 212B. An example of an analogue signal interference cancellation circuit 210 is illustrated in FIG. 22. The SIC circuit 210 comprises: a first coupling element 211A associated with the first node 212A; a second coupling element 211B associated with the second node 212B; and a tuneable phase shifter 213 in a path between the first and second coupling elements 211A, 211B. The SIC circuit 210 compensates for interference from transmitted signals, where one or more of the transmitted signals could simultaneously arrive at the receiver circuitry as unwanted received signals. The SIC circuit can, in some examples comprise an attenuator either at one or both of the coupling elements 211A, 211B or as a separate component. The attenuator can, in some examples, be a variable attenuator. The tuneable phase shifter 213 introduces a phase shift between the nodes 212A, 212B. In some but not necessarily all examples, the tuneable phase shifter 213 is a tuneable phase shifter that can introduce a variable phase shift The coupling elements 211A, 211B can be any suitable couplers. A coupling element 211 can, for example, be a high impedance connection, a power splitter or a directional RF coupler.

In some but not necessarily all examples, a selectable bypass (not illustrated) can be provided for the SIC circuitry 210. This allows the SIC circuitry to be used or not used.

There is at least one switch 110 for selecting one of multiple paths 120 between the first node 212A and each port of a first pair of ports. The switch 110 controls how the first node 212A is interconnected to the first pair of ports. In FIG. 20, switch 110A is configured to select one of multiple paths 121A between the first node 212A and the first port 521 and the second port 522 of the first multi-port antenna 50A (the first pair of ports). In FIGS. 21 and 23, the first pair of ports are the second port 522 of the first multi-port antenna 50A and the fourth port 524 of the second multi-port antenna 50B. In FIG. 21, switch 110A is configured to select one of multiple paths 121A between the first node 212A and the second port 522 of the first multi-port antenna 50A and the fourth port 524 of the second multi-port antenna 50B (the second pair of ports).

There is at least one switch 110 for selecting one of multiple paths 120 between the second node 212B and each port of a second pair of ports. The switch controls how the second node 212B is interconnected to the second pair of nodes. In FIG. 20, switch 110B is configured to select one of multiple paths 120 between the third port 523 and the fourth port 524 of the second multi-port antenna 50B (the second pair of ports). In FIGS. 21 and 23, the second pair of ports are the first port 521 of the first multi-port antenna 50A and the third port 523 of the second multi-port antenna 50B. In FIG. 21, switch 110B is configured to select one of multiple paths 121B between the second node 212B and the first port 521 of the first multi-port antenna 50A and the third port 523 of the second multi-port antenna 50B (the second pair of ports).

In the examples of FIGS. 20, 21 and 23, the switches 110 are used to change the phase difference distribution between the pair of ports and control the phase offset between the nodes 101, 103. The phase shift between the ports can for example be from 0 to 180. The change in phase difference between the pair of ports changes the radiation pattern and the isolation between the nodes 101 (Rx), 103 (Tx). Optionally the switches can also be used to apply an impedance transformation.

The apparatus 10 can therefore comprise a network of one or more radio frequency switches for selectively interconnecting radio transceivers (receivers, transmitter) simultaneously to antenna modules. This includes selectively interconnecting a first transceiver to the first node 212A and a second transceiver to the second node 212B.

The first transceiver and the second transceiver can operate simultaneously. The pair of first transceiver and second transceiver can operate simultaneously in the following operative combinations:

Transmitter, transmitter
Transmitter, receiver
Receiver, transmitter
Receiver, receiver.

The switch network is also configured to enable multiple different radiation patterns per transceiver (transmitter, receiver).

Figure 24:
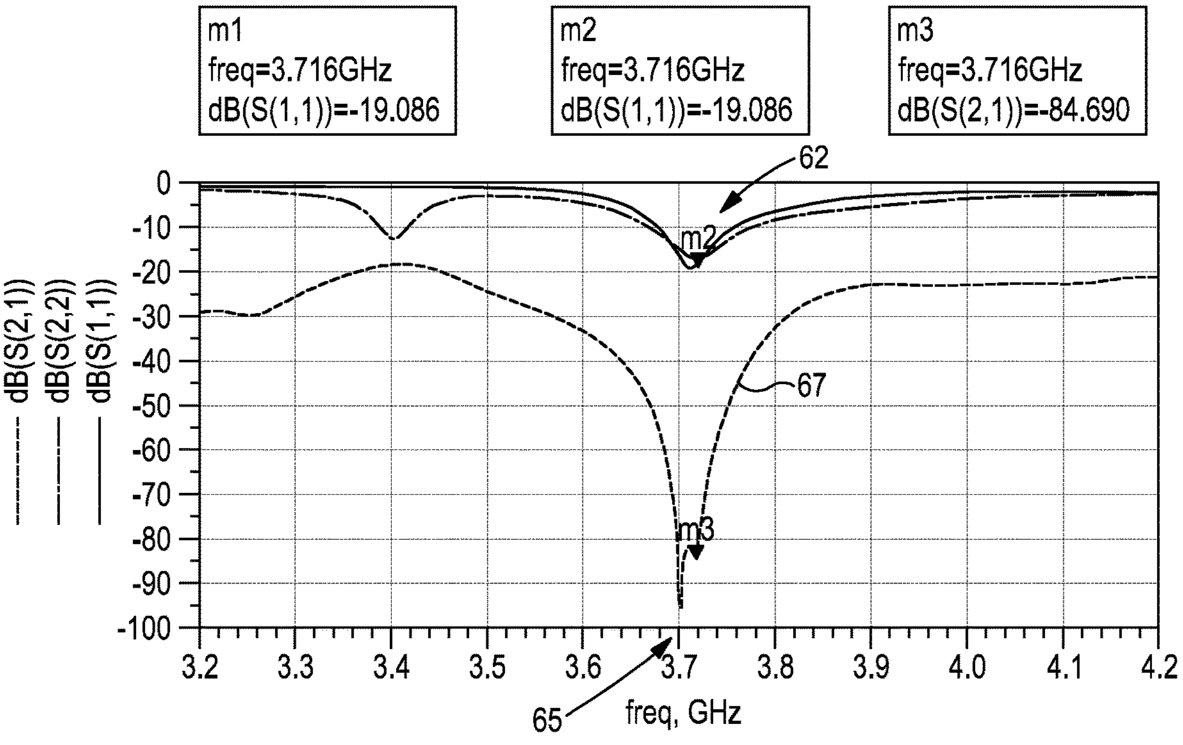
FIG. 24 shows another example embodiment of the subject matter described herein.

FIG. 24 illustrates, as an example, the S parameters for the system (FIG. 23) defined by the nodes 101 and 103 coupled to, respectively, the radiation pattern represented by use of the first pair of ports (521 and 523) and the radiation pattern represented by use of the second pair of ports (ports (522 and 524)). The system is configured to have an operational bandwidth 62 at a resonant frequency (fR) 65 for both transmission and reception. This is illustrated by the plot of the S11 and S22 parameters. The system is configured to have excellent isolation between the nodes 101 (Rx) and 103 (Tx). This is illustrated by the plot 67 of the S21 parameter. The isolation between the first node 101 and the second node 103 is between 40 and 90 dB.

In some examples, there is a first phase offset between ports 521 and 523 of 180o and a second phase offset between ports 522 and 524 of 0o for maximum isolation and a first set of radiation patterns. In other examples, there is a second offset between ports 521 and 523 of 0o and the first phase offset between 522 and 524 of 180o for maximum isolation and a second set of radiation patterns.

Referring to FIG. 20, a transmission line 120 interconnects lengthwise the first pair of ports 521, 522 and comprises one or more feed points along its length. The switch 110A is configured to selectively interconnect the first node 212A to one of the feed points. The transmission line 120 that interconnects the first port 521, and the second port 522 provides from the feed point a first path to the first port 521 and an electrically parallel second path to the second port 522.

The switch 110A is a 1PNT switch. Each one of the N terminals of the switch 110A provides an interconnection path 121A to a different feed point on the transmission line 120 that interconnects the first port 521, and the second port 522.

The multiple paths 121A between the first node 212A and each port of the first pair of ports 521, 522 share a common transmission line from the first node 212A to the pole of the first switch 110A. Each of the multiple paths 121A has a different phase offset dependent upon the feed point selected by the switch 110A. The phase offset between the first pair of ports 521, 522 can, for example, be any suitable value it can for example be between 0 and 180o.

A transmission line 120 interconnects lengthwise the second pair of ports 523, 524 and comprises one or more feed points along its length. The switch 110B is configured to selectively interconnect the second node 212B to one of the feed points. The transmission line 120 that interconnects the third port 523, and the fourth port 524. provides from the feed point a third path to the third port 523 and an electrically parallel fourth path to the fourth port 524.

The switch 110B is a 1PNT switch. Each one of the N terminals of the switch 110B provides an interconnection path 121B to a different feed point on the transmission line 120 that interconnects the third port 523 and the fourth port 524.

The multiple paths between the second node 212B and each port of the second pair of ports 523, 524 share a common transmission line from the second node 212B to the pole of the second switch 110B. Each of the multiple paths 121B has a different phase offset dependent upon the feed point selected by the switch 110B. The phase offset can, for example, be between 0 and 180o.

Referring to FIG. 21, a transmission line 120 interconnects lengthwise the first pair of ports 522, 524. This is a diagonal interconnection. The transmission line 120 comprises one or more feed points along its length. The switch 110A is configured to selectively interconnect the first node 212A to one of the feed points. The transmission line 120 that interconnects the second port 522, and the fourth port 524 provides from the feed point a path to the second port 522 and an electrically parallel path to the fourth port 524.

The switch 110A is a 1PNT switch. Each one of the N terminals of the switch 110A provides an interconnection path 121A to a different feed point on the transmission line 120 that interconnects the second port 522 and the fourth port 524.

The multiple paths 121A between the first node 212A and each port of the first pair of ports 522, 524 share a common transmission line from the first node 212A to the pole of the first switch 110A. Each of the multiple paths 121A has a different phase offset dependent upon the feed point selected by the switch 110A. The phase offset can, for example, be between 0 and 180o.

A transmission line 120 interconnects lengthwise the second pair of ports 521, 523. This is a diagonal interconnection. The transmission line 120 comprises one or more feed points along its length. The switch 110B is configured to selectively interconnect the second node 212B to one of the feed points. The transmission line 120 that interconnects the first port 521 and the third port 523 provides from the feed point a path to the first port 521 and an electrically parallel path to the third port 523.

The switch 110B is a 1PNT switch. Each one of the N terminals of the switch 110B provides an interconnection path 121B to a different feed point on the transmission line 120 that interconnects the first port 521 and the third port 523.

The multiple paths 121B between the second node 212B and each port of the second pair of ports 521, 523 share a common transmission line from the second node 212B to the pole of the second switch 110B. Each of the multiple paths 121B has a different phase offset dependent upon the feed point selected by the switch 110B. The phase offset can, for example, be between 0 and 180o.

Referring to FIG. 23, the first node 212A is interconnected to the second port 522. The second port 522 is interconnected, in series, to the fourth port 524 via multiple parallel paths 121A each of which introduces a different phase offset. The phase offset can, for example, be between 0 and 180o. The switches 1102, 1104 are used to select one of the multiple parallel paths for in-series electrical connection between the second port 522 and the fourth port 524. Each of the multiple paths is a diagonal interconnection.

The switch 1102 is a 1PNT switch and the switch 1104 is a 1PNT switch. The N parallel paths 121A are provided by interconnections between one terminal of the switch 1102 and one terminal of the switch 1104. The single pole of the switch 1102 is coupled to the second port 522. The single pole of the switch 1104 is coupled to the fourth port 524.

The second node 212B is interconnected to the third port 523. The third port 523 is interconnected, in series, to the first port 521 via multiple parallel paths 121B each of which introduces a different phase offset. The phase offset can, for example, be between 0 and 180o.

The switches 1103, 1101 are used to select one of the multiple parallel paths 121B for in-series electrical between the third port 523 and the first port 521. Each of the multiple paths 121B is a diagonal interconnection.

The switch 1103 is a 1PMT switch and the switch 1101 is a 1PMT switch. The M parallel paths are provided by interconnections between one terminal of the switch 1103 and one terminal of the switch 1101. The single pole of the switch 1103 is coupled to the third port 523. The single pole of the switch 1101 is coupled to the first port 521.

Figure 25A:
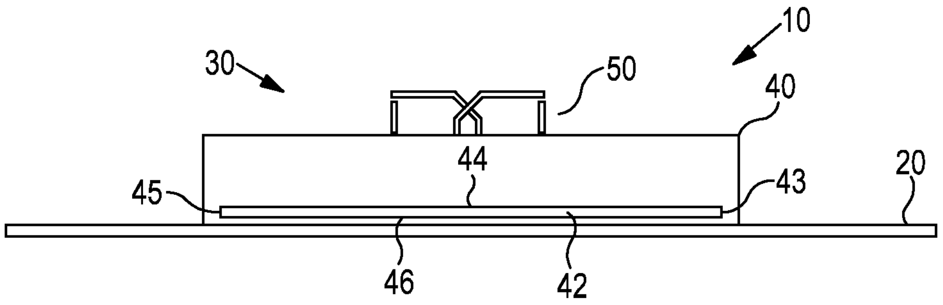
FIG. 25A shows another example embodiment of the subject matter described herein.

Referring to FIG. 25A, as previously described, the support 40 for supporting a multi-band antenna 50 can optionally comprise a slot 42 positioned between the multi-port antenna 50 and the ground plane 20. The combination of the support 40 and the multi-port antenna 50 form an antenna module 30. A length of the slot 42 (line integral along its length, as opposed to distance between its ends) can in some examples be substantially equal to one half of a wavelength 2\R that corresponds to frequency fR. In this example, the slot 42 is a closed slot 42 comprising a first pair of elongate opposing sides 44, 46 that are separated width wise and extend in parallel for a length of the slot 42 and a second pair of shorter sides that are separated lengthwise and extend for a width of the slot 42. In this example, the slot 42 has a length that is shorter than a width of the support 40. The slot 42, in this example, is rectangular. The elongate opposing sides 44, 46 are straight and parallel.

The slot 42 provides a choking effect and reduces return currents from the ground plane 20 via the support 40. The slot 42 directs any return currents on the support 40 away from the ports 52A, 52B of the multi-band antenna 50.

The geometry of the slot 42 can be adjusted to adjust isolation between the ports. For example, increasing the end to end separation of the slot 42 can adjust its Q-factor. The straightening of the slot 42 (compared to FIG. 5) more than doubles the end-to-end separation of the slot 42. The width of the slot can also be used to increase the Q value of the slot.

Figure 25B:
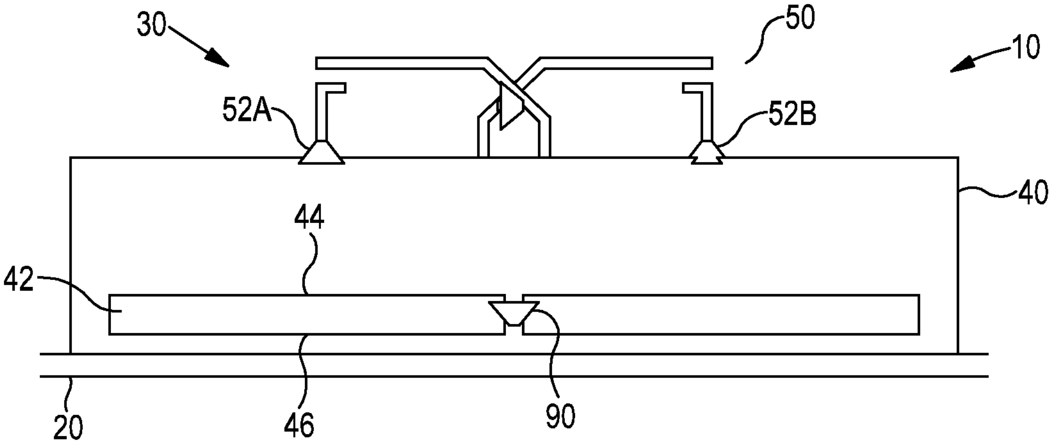
FIG. 25B shows another example embodiment of the subject matter described herein.

Referring to FIG. 25B, as previously described, in the apparatus 10, the support 40 for supporting a multi-band antenna 50 can optionally comprise a slot 42 positioned between the multi-port antenna 50 and the ground plane 20. The combination of the support 40 and the multi-port antenna 50 form an antenna module 30. In this example, the slot 42 has an associated lumped reactive component 90 that is used to tune the effect of the slot 42. The slot 42 provides a choking effect and reduces return currents from the ground plane 20 via the support 40. The slot 42 directs any return currents on the support 40 away from the ports 52A, 52B of the multi-band antenna 50. In the example illustrated the slot 42 is similar to the slot 42 illustrated in FIG. 25A. The lumped reactive component 90 bridges the slot extending between the elongate opposing sides 44, 46.

Figure 25C:
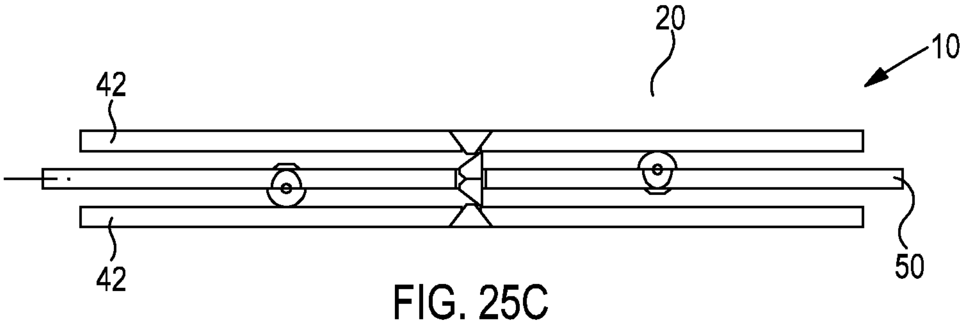
FIG. 25C shows another example embodiment of the subject matter described herein.

Referring to FIG. 25C, in the apparatus 10, the ground plane 20 has a slot 42 adjacent to the support 40 supporting the multi-band antenna 50. In this example, there are a pair of slots 42 in the ground plane 20 on opposite sides of the support 40. In this example, but not necessarily all examples, there is no slot 42 in the support 40. The slots 42 provide a choking effect and reduces return currents from the ground plane 20 via the support 40. The slots 42 directs any return currents on the ground plane 20 away from the support 40. In the example illustrated the slots 42 are similar to the slot 42 illustrated in FIG. 25A but are positioned differently. In some examples, lumped reactive component 90 can be associated with the slots 42, as illustrated in FIG. 25B.

In some examples, in the apparatus 10, the ground plane 20 has one or more slots 42 adjacent the support 40 and the support 40 comprises a slot 42 positioned between the multi-port antenna 50 and the ground plane 20.

The term "ground conductor" refers to the combination of the ground plane 20 and the support 40. The slot 42 can be a slot in the ground conductor, for example, the slot 42 can be in the support 40, and/or in the ground plane 20.

In some examples, the ground conductor can have a three-dimensional shape. In some but not necessarily all examples at least a portion of the ground conductor conforms to one or more surfaces of one or more of a device, mechanical part and/or electronic part. The ground conductor can, for example, conform to a housing part. In some but not necessarily all examples, the ground conductor has no flat planar portion at all or only one or more portions of the ground conductor comprise flat planar portions.

The apparatus 10 in FIG. 25 is similar to the apparatus illustrated in FIG. 5, except for the size of the support 40 and the shape of the slot 42.

Decreasing the Q-factor of the slot 42 will increase the bandwidth of the S parameters S11, S12. It increases the operational bandwidth of the radiation pattern in use. It also increases the isolation bandwidth.

Figure 26A:
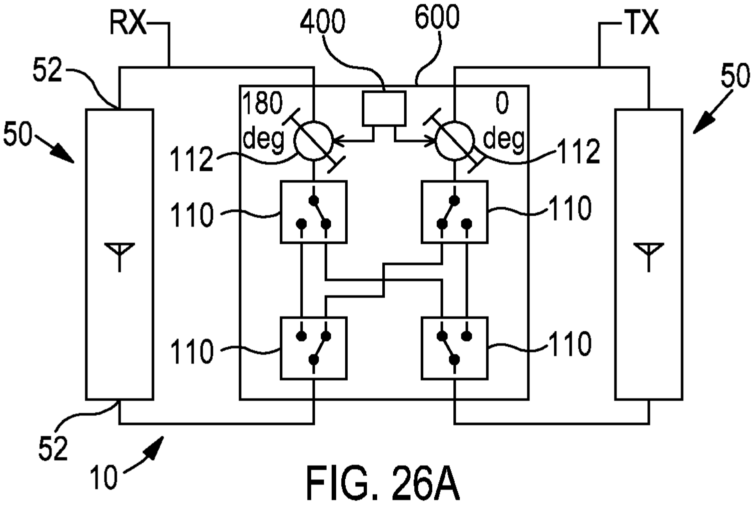
FIG. 26A shows another example embodiment of the subject matter described herein.
Figure 26B:
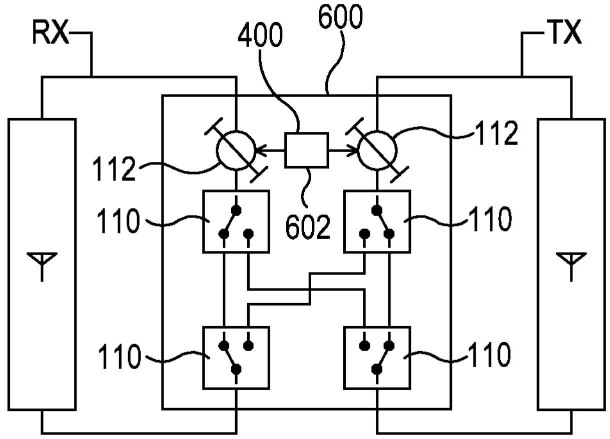
FIG. 26B shows another example embodiment of the subject matter described herein.

FIGS. 26A and 26B illustrate an example of the apparatus 10 that can operate in a full-duplex mode (FIG. 26A) or in a mode than enables selection of radiation patterns (FIG. 26B).

The apparatus 10 comprises two multi-band antennas 50. The multi-band antennas 50 can be as previously described.

A network of radio frequency switches 110 is configured to select ports 52 of the multi-band antennas 50 for use by transceivers.

In FIG. 26A, the network of radio frequency switches 110 has a first configuration. In the first configuration, the network of radio frequency switches 110 is configured to connect a first transceiver (RX) directly to a first port of first multi-band antenna 50 and to connect the first transceiver (RX), through a first phase shifter 112, to a second port of a second multi-band antenna 50. The interconnected ports are, in the examples, diagonally opposed.

In the first configuration, the network of radio frequency switches 110 is also configured to connect a second transceiver (TX) directly to a first port of the second multi-band antenna 50 and to connect the second transceiver (TX), through a second phase shifter 112, to a second port of the first multi-band antenna 50. The interconnected ports are, in the examples, diagonally opposed.

When the network of radio frequency switches 110 is controlled to be in the first configuration, the phase shifters 112 are controlled to provide different phase shifts. In this example, the difference between the phase shifts provided by the two phase shifters 112 is 180o.

In the first configuration, the apparatus 10 operates in a manner as described with reference to FIG. 23.

In FIG. 26B, the network of radio frequency switches 110 has a second configuration. In the second configuration, the network of radio frequency switches 110 is configured to connect the first transceiver (RX) directly to the first port of the first multi-band antenna 50 and to connect the first transceiver (RX), through the first phase shifter 112 to the second port of the first multi-band antenna 50.

In the second configuration, the network of radio frequency switches 110 is also configured to connect the second transceiver (TX) directly to the first port of the second multi-band antenna 50 and to connect the second transceiver (TX), through the second phase shifter 112, to the second port of the second multi-band antenna 50.

When the network of radio frequency switches 110 is controlled to be in the second configuration, the first and second phase shifters 112 are controlled to provide phase shifts that control antenna radiation patterns. The first phase shifter 112 controls the radiation of the first transceiver. The second phase shifter 112 controls the radiation of the second transceiver.

In the second configuration, the apparatus 10 operates in a manner as described, for example, with reference to FIG. 11A, 11B or 11C.

In this example, the network of switches 110 and the first and second phase shifters 112 are components of a module 600. The operation of the network of switches 110 and the first and second phase shifters 112 can be controlled by control circuitry 400. In the example illustrated, the control circuitry is a component of the module 600. In other examples, the control circuitry 400 is separate to the module 600.

Figure 27:
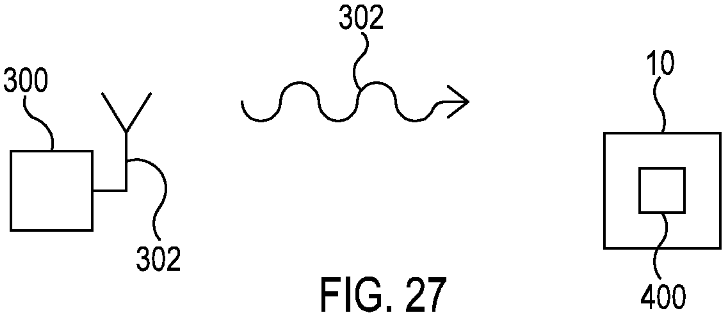
FIG. 27 shows another example embodiment of the subject matter described herein.

In the preceding examples reference has been made to switches 110 (and switch networks). As illustrated in FIG. 27, the switching of the switches can be controlled by control circuitry 400 at the apparatus 10.

Where the apparatus is a terminal such as a user equipment that receives radio communications from a network, then the network 300 can send commands 302 to the apparatus 10 that are used by the apparatus 10 to control operation of the switches 110. Consequently, at the apparatus 10, the apparatus 10 is configured to control operation of the switches 110 in dependence upon one or more received signals 302. The received signal 302 can be a command signal sent by a network node 302 such as a base station or access point. Thus in 3GPP NR, a gNB (base station) 302 sends a radio access signal (a signal specified by the 3GPP standards for radio access) 302 that is used by control circuitry 400 at the user equipment 10 to control the switch or switches 110, and for example, control:

how many receivers are used, what physical channels are used with what radiation patterns 60;

how many transmitters are used, what physical channels are used with what radiation patterns 60;

how many transmitters and receivers are used simultaneously, what physical channels are used with what radiation patterns.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Components that are described as connected or interconnected, can in some examples be operationally coupled and any number or combination of intervening elements can exist (including no intervening elements).

Where a structural feature has been described, it may be replaced by means for performing one or more of the functions of the structural feature whether that function or those functions are explicitly or implicitly described.

The radio frequency circuitry and the antenna may be configured to operate in a plurality of operational resonant frequency bands. For example, the operational frequency bands may include (but are not limited to) Long Term Evolution (LTE) (US) (734 to 746 MHz and 869 to 894 MHz), Long Term Evolution (LTE) (rest of the world) (791 to 821 MHz and 925 to 960 MHz), amplitude modulation (AM) radio (0.535-1.705 MHz); frequency modulation (FM) radio (76-108 MHz); Bluetooth (2400-2483.5 MHz); wireless local area network (WLAN) (2400-2483.5 MHz); hiper local area network (HiperLAN) (5150-5850 MHz); global positioning system (GPS) (1570.42-1580.42 MHz); US—Global system for mobile communications (US-GSM) 850 (824-894 MHz) and 1900 (1850-1990 MHz); European global system for mobile communications (EGSM) 900 (880-960 MHz) and 1800 (1710-1880 MHz); European wideband code division multiple access (EU-WCDMA) 900 (880-960 MHz); personal communications network (PCN/DCS) 1800 (1710-1880 MHz); US wideband code division multiple access (US-WCDMA) 1700 (transmit: 1710 to 1755 MHz, receive: 2110 to 2155 MHz) and 1900 (1850-1990 MHz); wideband code division multiple access (WCDMA) 2100 (transmit: 1920-1980 MHz, receive: 2110-2180 MHz); personal communications service (PCS) 1900 (1850-1990 MHz); time division synchronous code division multiple access (TD-SCDMA) (1900 MHz to 1920 MHz, 2010 MHz to 2025 MHz), ultra wideband (UWB) Lower (3100-4900 MHz); UWB Upper (6000-10600 MHz); digital video broadcasting-handheld (DVB-H) (470-702 MHz); DVB-H US (1670-1675 MHz); digital radio mondiale (DRM) (0.15-30 MHz); worldwide interoperability for microwave access (WiMax) (2300-2400 MHz, 2305-2360 MHz, 2496-2690 MHz, 3300-3400 MHz, 3400-3800 MHz, 5250-5875 MHz); digital audio broadcasting (DAB) (174.928-239.2 MHz, 1452.96-1490.62 MHz); radio frequency identification low frequency (RFID LF) (0.125-0.134 MHz); radio frequency identification high frequency (RFID HF) (13.56-13.56 MHz); radio frequency identification ultrahigh frequency (RFID UHF) (433 MHz, 865-956 MHz, 2450 MHz), frequency allocations for 5G may include e.g. 700 MHz, 3.6-3.8 GHz, 24.25-27.5 GHz, 31.8-33.4 GHz, 37.45-43.5, 66-71 GHz, mmWave, and >24 GHz).

A frequency band over which an antenna can efficiently operate is a frequency range where the antenna's return loss is less than an operational threshold. For example, efficient operation may occur when the antenna's return loss is better than (that is, less than) −6 dB or −10 dB.

As used here 'module' refers to a unit or apparatus that excludes certain parts/components that would be added by an end manufacturer or a user.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Any mechanical dimension used in the description and/or FIGs is an example only. The dimensions are determined by a specific center frequency used. Dimensions and exact implementation details will change if the antenna is designed to operate at a different frequency and/or if different materials are used for the implementation.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising
- a first multi-port antenna wherein the first multi-port antenna operates with a first radiation pattern when a first port is used and operates with a second radiation pattern, different to the first radiation pattern, when a second port, different to the first port, is used;
- a second multi-port antenna wherein the second multi-port antenna operates with a third radiation pattern when a third port is used and operates with a fourth radiation pattern, different to the third radiation pattern, when a fourth port, different to the third port, is used;
- at least one switch for selecting one of multiple paths between a node and respective ports of the first multi-port antenna and the second multi-port antenna; and
- a ground plane with a perimeter, wherein the first and second multi-port antennas share the ground plane,
- wherein the first multi-port antenna is part of a first antenna module comprising:
  - a first support, comprising conductive material, positioned within the perimeter of the ground plane and extending outward from the ground plane, wherein the first multi-port antenna is supported by the first support at a distance from the ground plane.

2. An apparatus as claimed in claim 1, wherein the pair of ports are the first port and the second port of the first multi-port antenna or
- wherein the pair of ports are the first port of the first multi-port antenna and the third port of the second multi-port antenna.

3. An apparatus as claimed in claim 1, wherein the multiple paths include a first path between the node and one of the pair of ports and another second path between the node and the other port of the pair of ports, wherein the first path and the second path are arranged at least partially in electrical parallel.

4. An apparatus as claimed in claim 1, wherein the multiple paths include a first path between the node and one port of the pair of ports and another second path between that port and the other port of the pair of ports, wherein the first path and the second path are arranged in electrical series.

5. An apparatus as claimed in claim 1, wherein the multiple paths between the node and each port of the pair of ports share a transmission line that comprises one or more feed points along a length of the transmission line and interconnects lengthwise the pair of ports, wherein the at least one switch is configured to selectively interconnect the node to one of the feed points.

6. An apparatus as claimed in claim 1, wherein the first port faces the fourth port, and the second port races the third port.

7. An apparatus as claimed in claim 6, wherein the at least one switch is configured to select one of multiple paths between the node and the first port and the third port.

8. An apparatus as claimed in claim 6, wherein the at least one switch or an additional switch is configured to select one of multiple paths between an additional node and the second port and the fourth port.

9. An apparatus as claimed in claim 1, comprising:
- a first set of parallel paths for interconnection of the first port and the third port, each of the first set of paths having a different phase offset;
- one or more first switches for selecting one of the first set of paths;
- a second set of parallel paths for interconnection of the second port and the fourth port, each of the second set of paths having a different phase offset; and
- one or more second switches for selecting one of the second set of paths.

10. An apparatus comprising:
- a first multi-port antenna wherein the first multi-port antenna operates with a first radiation pattern when a first port is used and operates with a second radiation pattern, different to the first radiation pattern, when a second port, different to the first port, is used;
- a second multi-port antenna wherein the second multi-port antenna operates with a third radiation pattern when a third port is used and operates with a fourth radiation pattern, different to the third radiation pattern, when a fourth port, different to the third port, is used; and
- at least one switch for selecting one of multiple paths between a node and respective ports of the first multi-port antenna and the second multi-port antenna,
- wherein the first multi-port antenna comprises a first antenna element coupled to the first port and a second antenna element coupled to the second port, wherein the first antenna element and the second antenna element are spaced apart and partially overlap without touching, wherein the first port provides a first indirect feed for the first antenna element that operates with the first antenna pattern and the second port provides a second indirect feed for the second antenna element that operates with the second antenna pattern, different to the first antenna pattern, wherein each of the first antenna element and the second antenna element has a same shape and are arranged with different handedness, wherein the first antenna element is a monopole antenna element of a first length, wherein the second antenna element is a monopole antenna element of a second length, and wherein the first antenna element is bent and the second antenna element is bent.

11. An apparatus as claimed in claim 1, wherein the second multi-port antenna is part of a second antenna module comprising:

a second support positioned within the perimeter of the ground plane and extending outwardly from the ground plane, wherein the second multi-port antenna is supported by the second support at a distance from the ground plane.

12. An apparatus as claimed in claim 1, configured as radio equipment or mobile radio equipment.

13. An apparatus comprising a first multi-port antenna wherein the first multi-port antenna operates with a first radiation pattern when a first port is used and operates with a second radiation pattern, different to the first radiation pattern, when a second port, different to the first port, is used;

a second multi-port antenna wherein the second multi-port antenna operates with a third radiation pattern when a third port is used and operates with a fourth radiation pattern, different to the third radiation pattern, when a fourth port, different to the third port, is used;

at least one switch for selecting one of multiple paths between a node and respective ports of the first multi-port antenna and the second multi-port antenna; and an analogue signal interference cancellation circuit coupled between the node and an additional node, wherein the analogue signal interference cancellation circuit comprises:

a first coupling element associated with the node;

a second coupling element associated with the additional node; and a phase shifter in a path between the first and second coupling elements.

14. An apparatus as claimed in claim 13, comprising a network of one or more radio frequency switches for selectively interconnecting radio transceivers simultaneously to antenna modules.

15. An apparatus as claimed in claim 14, wherein the network of one or more radio frequency switches is configured to enable multiple different radiation patterns per transceiver.

16. An apparatus as claimed in claim 13, wherein the pair of ports are the first port and the second port of the first multi-port antenna or wherein the pair of ports are the first port of the first multi-port antenna and the third port of the second multi-port antenna.

17. An apparatus as claimed in claim 13, wherein the multiple paths include a first path between the node and one of the pair of ports and another second path between the node and the other port of the pair of ports, wherein the first path and the second path are arranged at least partially in electrical parallel.

18. An apparatus as claimed in claim 13, wherein the multiple paths include a first path between the node and one port of the pair of ports and another second path between that port and the other port of the pair of ports, wherein the first path and the second path are arranged in electrical series.

19. An apparatus as claimed in claim 13, wherein the multiple paths between the node and each port of the pair of ports share a transmission line that comprises one or more feed points along a length of the transmission line and interconnects lengthwise the pair of ports, wherein the at least one switch is configured to selectively interconnect the node to one of the feed points.

20. An apparatus as claimed in claim 13, wherein the first port faces the fourth port, and the second port faces the third port.

* * * * *